(12) United States Patent
Hakkaku

(10) Patent No.: US 11,571,849 B2
(45) Date of Patent: Feb. 7, 2023

(54) THREE-DIMENSIONAL OBJECT MANUFACTURING METHOD AND MANUFACTURING APPARATUS

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 133 days.

(21) Appl. No.: 15/765,270

(22) PCT Filed: Oct. 7, 2016

(86) PCT No.: PCT/JP2016/079961
§ 371 (c)(1),
(2) Date: Apr. 1, 2018

(87) PCT Pub. No.: WO2017/061603
PCT Pub. Date: Apr. 13, 2017

(65) Prior Publication Data
US 2018/0290378 A1 Oct. 11, 2018

(30) Foreign Application Priority Data

Oct. 8, 2015 (JP) .............................. JP2015-200420
Jun. 10, 2016 (JP) .............................. JP2016-116270

(51) Int. Cl.
| | | |
|---|---|---|
| B29C 64/124 | (2017.01) | |
| B29C 64/112 | (2017.01) | |
| B29C 67/00 | (2017.01) | |
| B29C 70/68 | (2006.01) | |
| B33Y 10/00 | (2015.01) | |
| B33Y 30/00 | (2015.01) | |

(52) U.S. Cl.
CPC .......... B29C 64/124 (2017.08); B29C 64/112 (2017.08); B29C 67/00 (2013.01);
(Continued)

(58) Field of Classification Search
CPC ..... B29C 64/124; B29C 64/112; B29C 67/00; B29C 70/68; B29C 64/00; B29C 64/106;
(Continued)

(56) References Cited

U.S. PATENT DOCUMENTS 10,462,907 B2 * 10/2019 Lewis ................... B29C 64/118
2009/0173443 A1    7/2009 Kozlak et al.

FOREIGN PATENT DOCUMENTS

JP    S6216553     1/1987
JP    H04366617    12/1992
(Continued)

OTHER PUBLICATIONS

"Search Report of Europe Counterpart Application", dated Sep. 12, 2018, p. 1-p. 7.
(Continued)

*Primary Examiner* — Matthew J Daniels
*Assistant Examiner* — Shibin Liang
(74) *Attorney, Agent, or Firm* — JCIPRNET

(57) ABSTRACT

A three-dimensional object manufacturing method is provided and includes: a cavity portion material layer forming step of discharging a droplet of a material from a discharging head through an inkjet method to form a cavity portion material layer, which is a material layer configuring a periphery of at least one part of a cavity; a sandwiching member installing step of installing a lid member, which is a member arranged with at least one part sandwiched between a plurality of material layers, on a cavity portion material layer; and a material layer-on-sandwiching member forming step of discharging the droplet of the cavity portion material from the discharging head through the inkjet method on at least one part of the lid member to further form the material layer on the lid member.

10 Claims, 14 Drawing Sheets

(52) U.S. Cl.
CPC .......... *B29C 70/68* (2013.01); *B29K 2715/00* (2013.01); *B33Y 10/00* (2014.12); *B33Y 30/00* (2014.12)

(58) Field of Classification Search
CPC ......... B29C 70/72; B33Y 10/00; B33Y 30/00; B29K 2715/00; H05K 3/00
See application file for complete search history.

(56) References Cited

FOREIGN PATENT DOCUMENTS

| | | | |
|---|---|---|---|
| JP | 3557926 | * 12/1998 | ............ B29C 67/00 |
| JP | 2000190086 | 7/2000 | |
| JP | 2015009495 | 1/2015 | |
| JP | 2015-134411 | 7/2015 | |
| WO | 2013154723 | 10/2013 | |
| WO | 2015119130 | 8/2015 | |
| WO | 2015136982 | 9/2015 | |

OTHER PUBLICATIONS

"International Search Report (Form PCT/ISA/210)"of PCT/JP2016/079961, dated Dec. 20, 2016, with English translation thereof, pp. 1-4.

"Office Action of Japan Counterpart Application," dated May 14, 2019, with English translation thereof, p. 1-p. 9.

Office Action of Japan Counterpart Application, with English translation thereof, dated Feb. 4, 2020, pp. 1-5.

* cited by examiner

THREE-DIMENSIONAL OBJECT MANUFACTURING METHOD AND MANUFACTURING APPARATUS

CROSS-REFERENCE TO RELATED APPLICATION

This application is a 371 application of the international PCT application serial no. PCT/JP2016/079961, filed on Oct. 17, 2016, which claims the priority benefits of Japan application no. 2015-200420, filed on Oct. 8, 2015 and Japan application no. 2016-116270, filed on Jun. 10, 2016. The entirety of each of the above-mentioned patent applications is hereby incorporated by reference herein and made a part of this specification.

TECHNICAL FIELD

The present invention relates to a three-dimensional object manufacturing method and a manufacturing apparatus.

BACKGROUND ART

Conventionally, an inkjet printer that carries out printing through an inkjet method is being widely used (see e.g., Non-Patent Literature 1). Furthermore, in recent years, a method carried out using an inkjet head (inkjet shaping method) is being reviewed for the configuration of a manufacturing apparatus (3D printer) for shaping the three-dimensional object.

In this case, the manufacturing apparatus shapes the three-dimensional object through a layering and shaping method of overlapping a plurality of layers of ink formed by the inkjet head. Each layer is formed based on three-dimensional shaping data representing a three-dimensional shape of the three-dimensional object to be produced and coloring data of the surface.

CITATION LIST

Patent Literature

Non-Patent Literature 1: Internet URL http://www.mimaki.co.jp
Patent Literature 1: Japanese Unexamined Patent Publication No. 2015-134411

SUMMARY

Technical Problems

Furthermore, in recent years, shaping of a larger three-dimensional object is sometimes desired due to the spread of application of the manufacturing apparatus. However, when shaping a large three-dimensional object, a shaping volume becomes large, and hence the amount of material (shaping material, color ink, support material, etc.) used for the shaping of the three-dimensional object increases.

Furthermore, when the amount of material to use increases, the material needs to be refilled frequently at the time of the shaping, which may increase the trouble required for the work of shaping. Moreover, due to the increase in the amount of necessary material, the cost of shaping may rise. Furthermore, when the usage life of the three-dimensional object comes to an end, the amount of waste also increases, which becomes a problem in terms of environment.

As a result of the increase in weight due to the enlargement of the three-dimensional object, the three-dimensional object may break by its own weight as the three-dimensional object becomes larger.

For example, when the three-dimensional object includes an elongate extending portion, such portion has low strength (bending strength) and tends to easily break. In the invention described in Patent Literature 1, the problem of lack of strength is solved by providing a reinforcement material in a reinforcement hole extending from an opening on an outer surface to the interior of the three-dimensional object. A significant problem does not arise even if the strength is low if the three-dimensional object is small, but as the weight increases with enlargement of the three-dimensional object, the problem of strength becomes a serious problem in large three-dimensional objects.

Thus, it is desired to more appropriately shape the three-dimensional object. The present invention provides a three-dimensional object manufacturing method and a manufacturing apparatus capable of overcoming such problem.

Solutions to the Problems

In the three-dimensional object to be shaped, usually, an interior region that cannot be visually recognized from the outside is not necessarily a required region. Thus, the inventor of the present application contrived forming only the portion of a surface layer without forming the interior region, which becomes a waste portion. According to such configuration, the usage amount of the material can be reduced, and the weight of the three-dimensional object can be reduced. Furthermore, the trouble of refilling the material, and the like can be reduced, and the trouble required for the work of shaping can also be reduced. Moreover, by reducing the usage amount of the material, the cost of shaping can be suppressed, and furthermore, the source can be saved and the waste can be reduced when discarding the three-dimensional object.

However, the inventor of the present application found out, through intensive research, that the three-dimensional object cannot be appropriately shaped by merely forming the interior of the three-dimensional object as a cavity. More specifically, a method of forming a support layer in an interior region of the three-dimensional object using a material of the support layer that can be removed after the shaping, and the like is considered for the method of forming the cavity in the interior of the three-dimensional object. In this case, however, a hole, and the like for taking out the material of the support layer after the completion of the shaping needs to be formed. Furthermore, even if a hole is formed, it may take a great time to take out the material of the support layer. Moreover, in this case, even if the usage amount of the material configuring the three-dimensional object is reduced, the usage amount of the material of the support layer is increased by such amount. As a result, the cost may not be sufficiently reduced.

Furthermore, when not forming the support layer, and the like in the interior of the three-dimensional object, the overhanging portion inevitably needs to be shaped when forming the three-dimensional object while blocking the opening of the cavity. Thus, in this case as well, it is not possible to appropriately shape the three-dimensional object interiorly including the cavity.

With regard to this, the inventor of the present application considered, through further thorough research, layering and shaping the inner wall of the cavity without an overhanging portion in the middle of shaping, installing a lid-like member, and the like for covering the opening of the cavity at a position layered up to a portion the upper surface of the cavity does not reach an outer contour portion of the surface layer of the three-dimensional object, and further carrying out the shaping similarly thereon. According to such configuration, the shaping material can be layered so as to block the opening of the cavity, as needed, and the three-dimensional object can be shaped. Furthermore, the three-dimensional object can be shaped in a more appropriate state even when not completely blocking the opening. In this case, the inner wall of the cavity in the interior of the three-dimensional object does not have the overhanging portion, and thus the support layer, and the like do not need to be formed. Thus, the three-dimensional object interiorly including the cavity can be more appropriately shaped. As a result, an outer shape of the three-dimensional object is formed with an outer shape of a plurality of lid-like members formed as a framework, and such outer shape is complemented by the material discharged from the inkjet head.

Furthermore, reducing the usage amount of the material (shaping material) used for shaping is not limited to when shaping a large three-dimensional object, and is similarly desired when shaping a small three-dimensional object. When considered in a more generalized manner, using various members that can be sandwiched between layers of the shaping material for the lid-like member is also considered. In other words, the present invention has the following configurations in order to solve the problem described above.

(Configuration 1) A three-dimensional object manufacturing method for shaping a three-dimensional object interiorly including a cavity by layering a plurality of material layers, which are layers formed with a material used for shaping of the three-dimensional object, the three-dimensional object manufacturing method including: a cavity portion material layer forming step of discharging a droplet of a cavity portion material, which is a material configuring at least one part of a periphery of the cavity, from a discharging head through an inkjet method to form a cavity portion material layer, which is a material layer configuring a periphery of at least one part of the cavity; a sandwiching member installing step of installing a sandwiching member, which is a member arranged with at least one part sandwiched between the plurality of material layers, on the cavity portion material layer; and a material layer-on-sandwiching member forming step of discharging the droplet of the cavity portion material from the discharging head through the inkjet method on at least one part of the sandwiching member to further form the material layer on the sandwiching member.

According to the configuration, the three-dimensional object can be appropriately shaped through the layering and shaping method, which is a layering method of sequentially layering the material layer (cavity portion material layer) and the sandwiching member to form the three-dimensional structural object. Furthermore, the cavity can be appropriately formed in the interior of the three-dimensional object by forming the cavity portion material layer, and the like.

Furthermore, in this case, the interior cavity can be appropriately formed with various shapes by sandwiching the sandwiching member in the middle of layering the cavity portion material layers. More specifically, the cavity portion material layer can be formed so as to cover at least one part of the opening of the cavity, and the cavity whose inner wall has an overhanging shape can be formed. Thus, according to such configuration, for example, the three-dimensional object interiorly including the cavity can be more appropriately shaped.

Furthermore, the strength of the three-dimensional object can be enhanced, and the like by overlapping the plurality of cavity portion material layers with the sandwiching member sandwiched in between. For example, a function of a reinforcement member can be given to the sandwiching member by using the sandwiching member having a predetermined strength of a certain extent or greater, so that the strength of the three-dimensional object can be appropriately enhanced. The strength of the three-dimensional object thus can be appropriately suppressed from lowering by forming the cavity.

In this configuration, a known inkjet head, and the like can be suitably used for the discharging head. Furthermore, a known shaping ink, transparent ink, white ink, process color ink, and the like can be suitably used for the cavity portion material. In this case, the ink is, for example, liquid discharged through the inkjet method. Moreover, the cavity portion material may be a material that forms an outer shape of a shaped object in addition to being an outer wall of the cavity portion. Furthermore, in the material layer-on-sandwiching member forming step, further forming the material layer on the sandwiching member may be forming the material layer so that one part is mounted on the sandwiching member.

Furthermore, use of various members according to the necessary strength, and the like for the sandwiching member is considered. For example, use of a sheet-like member, a plate-like member, and the like for the sandwiching member is considered. Furthermore, the sandwiching member may be a lid-like member that covers the opening of the cavity of the three-dimensional object. In this case, the opening of the cavity of the three-dimensional object may be an opening of the cavity formed by this time point in the middle of the shaping of the three-dimensional object. Moreover, use of, for example, a member that covers the entire opening of the cavity for the sandwiching member is considered. According to such configuration, the opening of the cavity can be more appropriately covered. Furthermore, a member that covers one part of the opening of the cavity may be used for the sandwiching member. In this case, use of a sandwiching member in which a hole is formed at one part is considered. Furthermore, use of a sandwiching member in which holes of a predetermined shape are formed in a constant arrangement such as a state in which a frame-shaped member formed with a hole of a predetermined shape is arranged side by side is also considered. In such cases as well, the cavity portion material layer can be appropriately layered by covering a region where at least the next cavity portion material layer is to be formed in the opening of the cavity. The three-dimensional object manufactured through such method can be considered to have a configuration in which the sandwiching member serves as a framework (frame) of the outer shape and such framework is complemented with the cavity portion material.

(Configuration 2) The sandwiching member installing step includes: installing the sandwiching member on the cavity portion material layer so that the sandwiching member is hidden in an interior of the three-dimensional object after completion of shaping. According to such configuration, the sandwiching member can be appropriately used while preventing the influence on the outer appearance of the three-dimensional object.

When referring to the sandwiching member being hidden in the interior of the three-dimensional object after the completion of the shaping, this means, for example, that the outer periphery of the sandwiching member does not run out to the outer side than the cavity portion material layer formed above and below the sandwiching member. In the sandwiching member installing step, the sandwiching member having the shape and the size corresponding to the shape of the three-dimensional object at the position to install is preferably used based on the shaping data indicating the three-dimensional object to shape. Such sandwiching member may be prepared in advance based on the shaping data. Furthermore, the sandwiching member having the necessary size and shape may be created based on the shaping data during the operation of shaping.

(Configuration 3) The sandwiching member installing step includes: installing the sandwiching member such that a shape of an outer periphery of the sandwiching member becomes greater than an opening of the cavity at a position for installing the sandwiching member. The sandwiching member may be a planar member wider than the opening (cavity upper surface) of the cavity. According to such configuration, the opening of the cavity can be more appropriately covered with the sandwiching member. Thus, the material layer above the sandwiching member can be more appropriately formed.

(Configuration 4) in the three-dimensional object obtained after completion of shaping, at least one part of an inner wall of the three-dimensional object surrounding the cavity has an overhanging shape in which a portion on an upper side projects out toward an inner side of the cavity; and the sandwiching member installing step includes: installing the sandwiching member at a position to form the inner wall to an overhanging shape.

When the inner wall surrounding the cavity has an overhanging shape, it is difficult to form a curved surface of the inner wall by merely layering the cavity portion material layer. With respect thereto, according to such configuration, the cavity in the interior of the three-dimensional object can be appropriately formed even if the inner wall has an overhanging shape.

In such configuration, the inner wall surrounding the cavity is a wall surface formed by the respective inner peripheral ends of a plurality of cavity portion material layers layered so as to surround the cavity. Furthermore, in this configuration, installing the sandwiching member at the position to form the inner wall to the overhanging shape means, for example, installing the sandwiching member at a position where at least one part of the cavity portion material layer on the upper side of the sandwiching member projects out to the inner side of the cavity than the cavity portion material layer on the lower side. According to such configuration, the inner wall having the overhanging shape can be appropriately shaped by forming the plurality of cavity portion material layers with the sandwiching member in between. Furthermore, in this case, portions other than the portion of overhanging shape may be formed without sandwiching the sandwiching member.

(Configuration 5) The sandwiching member is a sheet-like member. In this case, a sheet-like film, and the like can be suitably used for the sandwiching member. According to such configuration, the sandwiching member having a configuration of being easily sandwiched between the cavity portion material layers can be appropriately used. Furthermore, as the cutting, and the like of the sandwiching member are facilitated, the shape of the sandwiching member can be easily and appropriately adjusted in accordance with the position to install the sandwiching member.

(Configuration 6) The sandwiching member is a plate-like member. According to such configuration, the strength of the sandwiching member can be more appropriately enhanced. Thus, the cavity portion material layer can be more appropriately formed on the sandwiching member. Furthermore, the strength of the entire three-dimensional object can be more appropriately enhanced.

(Configuration 7) The sandwiching member is a member formed with a material having adhesiveness with respect to the cavity portion material. According to such configuration, the sandwiching member can be more appropriately fixed between the cavity portion material layers. Thus, the sandwiching member can be appropriately prevented from detaching, and the like from between the cavity portion material layers after the completion of the shaping.

(Configuration 8) The cavity portion material is an ultraviolet curable ink; and the sandwiching member is a member formed with a material on which an ultraviolet curable ink fixes when irradiated with an ultraviolet light.

When configured in such manner, the three-dimensional object can be more appropriately shaped by using the ultraviolet curable ink for the cavity portion material. Furthermore, the sandwiching member can be installed between the cavity portion material layers with sufficient adhesiveness by fixing the cavity portion material to the sandwiching member by irradiation of the ultraviolet light. Thus, the sandwiching member can be appropriately prevented from detaching, and the like from between the cavity portion material layers after the completion of the shaping.

In such configuration, the material on which the ultraviolet curable ink fixes when irradiated with the ultraviolet light means that when irradiated with the ultraviolet light, the ink can be fixed on the relevant material with sufficient adhesiveness. More specifically, use of a metal plate such as stainless steel and aluminum, a resin sheet such as styrol, acrylic, Polyethylene Terephthalate (PET), and polycarbonate, a print substrate such as bakelite, glass epoxy, alumina, and Flexible Printed Circuits (FPC) for such material is considered.

(Configuration 9) The sandwiching member is an electronic circuit substrate having at least a wiring pattern. According to such configuration, the sandwiching member can be provided with a wider range of functions.

(Configuration 10) A manufacturing apparatus for shaping a three-dimensional object interiorly including a cavity by layering a plurality of material layers, which are layers formed with a material used for shaping of the three-dimensional object, and the manufacturing apparatus including: a discharging head that discharges a droplet of a cavity portion material, which is a material configuring at least one part of a periphery of a cavity, through an inkjet method; and a sandwiching member installer that installs a sandwiching member, which is a member arranged with at least one part sandwiched between the plurality of material layers, on the material layer; wherein the discharging head discharges the droplet of the cavity portion material to form a cavity portion material layer, which is a material layer configuring a periphery of at least one part of the cavity; the sandwiching member installer installs the sandwiching member on the cavity portion material layer; and the discharging head further discharges the droplet of the cavity portion material on at least one part of the sandwiching member to form a support layer on the sandwiching member. According to such configuration, effects similar to configuration 1 can be obtained.

(Configuration 11) A three-dimensional object manufacturing method for shaping a three-dimensional object while forming a support layer for supporting a periphery of the three-dimensional object being shaped, the three-dimensional object manufacturing method method including: a cavity portion support layer forming step of discharging a droplet of a support material, which becomes a material of the support layer, from a discharging head through an inkjet method to form a plurality of support layers interiorly including a cavity in a layered manner, and discharging a droplet of the support material from the discharging head through the inkjet method to form a cavity portion support layer, which is a support layer configuring a periphery of at least one part of the cavity; a sandwiching member installing step of installing a sandwiching member, which is a member arranged with at least one part sandwiched between the plurality of support layers, on the cavity portion support layer; and a support layer-on-sandwiching member forming step of discharging the droplet of the support material from the discharging head through the inkjet method on at least one part of the sandwiching member to further form a support layer on the sandwiching member.

According to such configuration, the support layer interiorly including the cavity can be appropriately formed. Thus, the cost in the shaping of the three-dimensional object can be appropriately suppressed. In this configuration, other than using the support material in place of the cavity portion material, the operations of the cavity portion support layer forming step, the sandwiching member installing step, and the support layer-on-sandwiching member forming step may be carried out same as or similar to the operations of the cavity portion material layer forming step, the sandwiching member installing step, and the material layer-on-sandwiching member forming step described in configuration 1 through configuration 10.

(Configuration 12) A manufacturing apparatus that shapes a three-dimensional object while forming a support layer for supporting a periphery of the three-dimensional object being shaped, and the manufacturing apparatus including: a discharging head that discharges a droplet of a support material, which becomes a material of the support layer, through an inkjet method to form a plurality of support layers interiorly including a cavity in a layered manner; and a sandwiching member installer that installs a sandwiching member, which is a member arranged with at least one part sandwiched between the plurality of support layers, on the support layer; where the discharging head discharges the droplet of the support material to form a cavity portion support layer, which is the support layer configuring a periphery of at least one part of the cavity; the sandwiching member installer installs the sandwiching member on the cavity portion support layer; and the discharging head further discharges the droplet of the support material on at least one part of the sandwiching member to form the support layer on the sandwiching member. According to such configuration, effects similar to configuration 11 can be obtained.

(Configuration 13) A three-dimensional object shaping method of the present invention is a three-dimensional object shaping method for shaping a three-dimensional object through a layering and shaping method using a curable resin, and the three-dimensional object shaping method including: a first process of layering the curable resin and shaping a shape of an exterior of the three-dimensional object while forming a cavity in an interior of the three-dimensional object; and a second process of fitting a solid body in the cavity and further layering the curable resin on the solid body, wherein three-dimensional object manufacturing method carrying out the first process and the second process once or over plural times.

The consumption of the shaping material such as the cavity portion material can be reduced by forming the cavity in the interior of the three-dimensional object and fitting the solid body in the cavity. Furthermore, since the cavity formed in the interior of the three-dimensional object needs to have the upper part closed with the curable resin, at least one part of the inner wall of the cavity has an overhanging shape, but the overhanging can be avoided by layering the resin with the solid body as a base.

(Configuration 14) In the three-dimensional object shaping method of the present invention, in the second process, a solid body having a smaller specific weight than the curable resin may be fitted.

The weight of the three-dimensional object can be reduced by fitting the solid body having a smaller specific weight than the curable resin into the cavity formed in the interior of the three-dimensional object.

(Configuration 15) In the three-dimensional object shaping method of the present invention, in the second process, a solid body lower than a depth of the cavity may be fitted.

According to such configuration, the solid body does not project out from the cavity, and collision with a flattening roller for flattening the layering surface of the curable resin can be avoided.

(Configuration 16) In the three-dimensional object shaping method of the present invention, in the second process, a plurality of layers of the curable resin may be layered until a layering surface becomes flat on an upper surface of a layer to form the cavity and the solid body.

According to such configuration, the step difference of the upper surface of the layer formed with the cavity and the solid body can be eliminated.

(Configuration 17) In the three-dimensional object shaping method of the present invention, in the first process, the cavity whose diameter becomes larger toward the upper side may be formed. According to such configuration, the inner wall of the cavity is easily formed and the solid body is easily fitted into the cavity.

(Configuration 18) In the three-dimensional object shaping method of the present invention, the solid body may be foamable resin, sponge, wood, cork, or rubber, or a combination thereof. According to such configuration, the three-dimensional object can be lightly and inexpensively shaped.

(Configuration 19) In the three-dimensional object shaping method of the present invention, the second process may include installing a substrate formed with an electronic circuit with a surface formed with the electronic circuit facing the cavity, and further layering the curable resin on the substrate. According to such configuration, the controls such as causing the three-dimensional object to emit light, to move, or to output sound can be carried out.

(Configuration 20) In the three-dimensional object shaping method of the present invention, a solid body having a greater specific weight than the curable resin may be fitted when carrying out the second process in a region on a lower side of the three-dimensional object. According to such configuration, the center of gravity of the three-dimensional object is lowered so that the three-dimensional object can be stably mounted.

Effect of the Invention

According to the present invention, for example, the three-dimensional object interiorly including the cavity can be more appropriately shaped.

DESCRIPTION OF EMBODIMENT

Figure 1A:
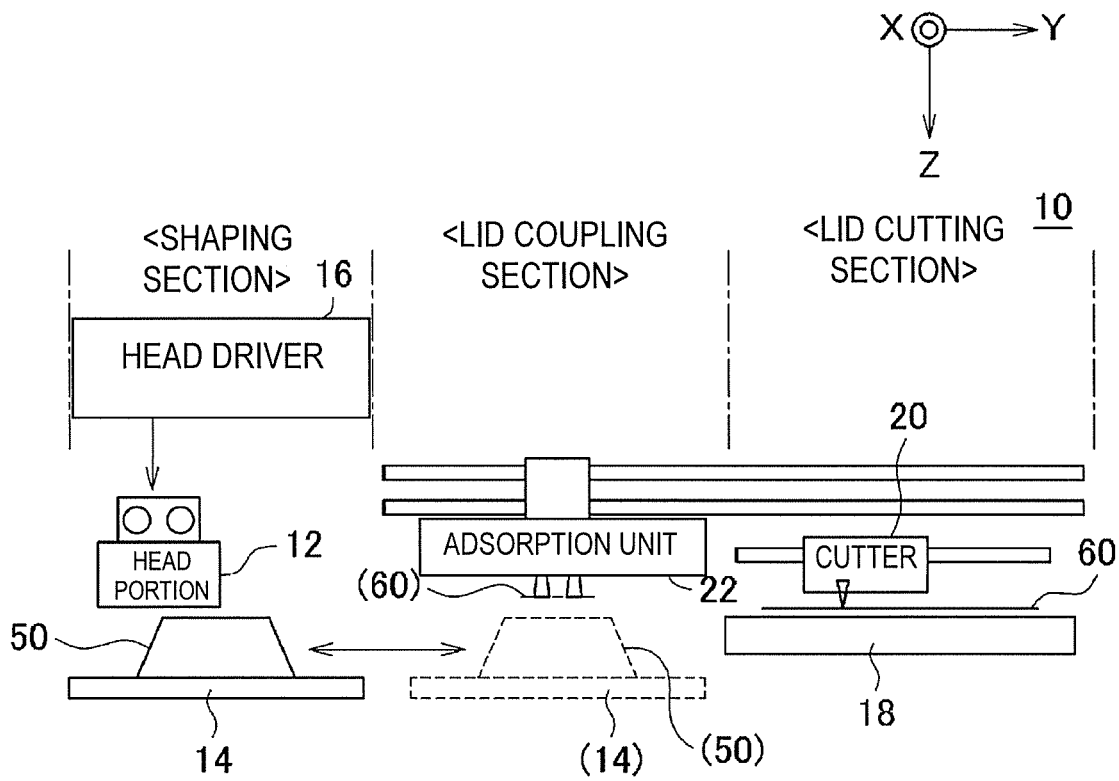
FIG. 1(*a*) and FIG. 1(*b*) are views showing one example of a manufacturing apparatus according to one embodiment of the present invention.
Figure 1B:
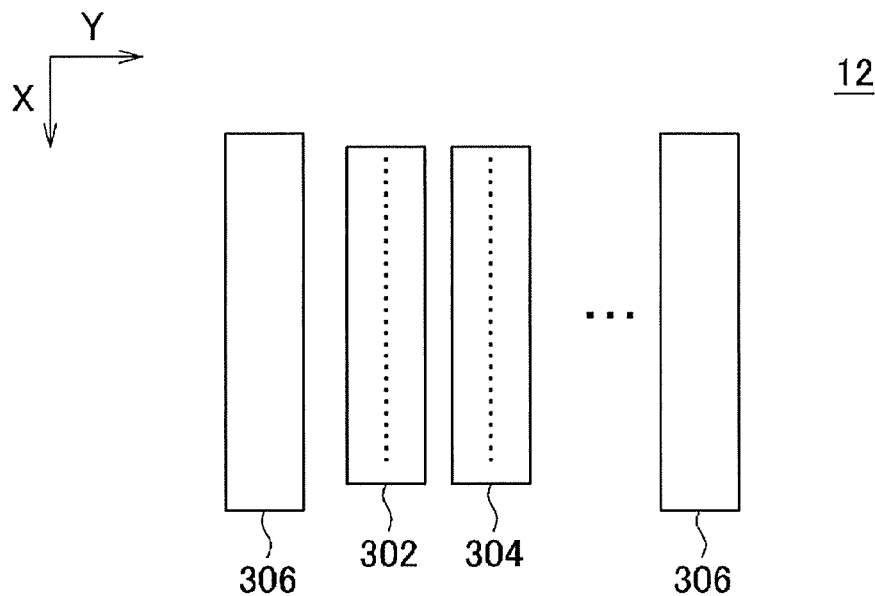

Hereinafter, an embodiment according to the present invention will be described with reference to the drawings. FIG. 1(a) and FIG. 1(b) show one example of a manufacturing apparatus 10 according to one embodiment of the present invention. FIG. 1(a) shows one example of a configuration of the main part of the manufacturing apparatus 10. FIG. 1(b) shows one example of a configuration of a head portion 12 in the manufacturing apparatus 10.

In the present example, the manufacturing apparatus 10 is a device (three-dimensional object manufacturing apparatus) that shapes a three-dimensional object 50 through a layering and shaping method, and shapes (manufactures) the three-dimensional object 50 by layering a plurality of material layers, which are layers formed with a material used for the shaping of the three-dimensional object 50. In this case, the layering and shaping method is, for example, a method of shaping the three-dimensional object 50 by overlapping a plurality of layers. Furthermore, the three-dimensional object 50 is a three-dimensional structural object shaped, for example, by layering a plurality of material layers. Furthermore, in the present example, the manufacturing apparatus 10 shapes the three-dimensional object 50 (see FIG. 2(b)) internally including a cavity 56 by a shaping method described below. Furthermore, in this case, a cavity portion material, which is a material configuring at least one part of the periphery of the cavity 56, is used to form a cavity portion material layer, which is a material layer configuring at least one part of the periphery of the cavity 56 in the operation of shaping.

Other than the points described below, the manufacturing apparatus 10 may have a configuration same as or similar to a known manufacturing apparatus. Furthermore, the manufacturing apparatus 10 may be a device in which one part of the configuration of the known inkjet printer is changed. The manufacturing apparatus 10 may be a device in which one part of an inkjet printer for two-dimensional image printing using an ultraviolet curable ink (UV ink: Ultra Violet ink) is changed. Furthermore, other than the illustrated configuration, the manufacturing apparatus 10 may also include, for example, various types of configurations necessary for shaping, and the like of the three-dimensional object 50. Moreover, other than the illustrated configuration, the manufacturing apparatus 10 further includes a controller that controls each portion of the manufacturing apparatus 10 based on the shaping data, and the like.

The manufacturing apparatus 10 has a configuration divided to a shaping section for carrying out shaping, a lid cutting section for preparing a lid member 60, to be described below, and a lid coupling section for installing the lid member 60, and includes a head portion 12, a shaping table 14, a head driver 16, a cutting table 18, a cutter 20, and an adsorption unit 22. Each of such configurations is arranged in each of the shaping section, the lid cutting section, and the lid coupling section, as shown in FIG. 1(a).

The head portion 12 is a portion that discharges a droplet (ink droplet) of a cavity portion material, which becomes the material of the three-dimensional object 50, and the like, and is arranged in the shaping section of the manufacturing apparatus 10. Furthermore, the head portion 12 includes an inkjet head that discharges a droplet of the cavity portion material, and the like, which cures according to a predetermined condition, and forms each layer configuring the three-dimensional object 50 in an overlapping manner by curing the cavity portion material discharged from the inkjet head. A specific configuration of the head portion 12 will be described in more detail later.

The shaping table 14 is a table-shaped member that supports the three-dimensional object 50 being shaped, and is arranged at a position facing the head portion 12 and has the three-dimensional object 50 being shaped mounted on an upper surface. Furthermore, in the present example, the shaping table 14 has a configuration in which at least the upper surface is movable in an up and down direction (Z direction in the figure), and moves the upper surface with the advancement of the shaping of the three-dimensional object 50. Moreover, the shaping table 14 is also movable in a horizontal direction (Y direction in the figure: main scanning direction), which is a direction within a plane orthogonal to the up and down direction, and relatively moves the three-dimensional object 50 with respect to the head portion 12 by, for example, moving in a feeding direction set in advance with the three-dimensional object 50 mounted thereon. In this case, the feeding direction is an X direction in the figure. Furthermore, the shaping table 14 thus causes the head portion 12 to carry out a sub-scanning operation of relatively moving with respect to the three-dimensional object 50 in a sub-scanning direction (X direction in the figure) set in advance. In this case, causing the head portion 12 to carry out the sub-scanning operation means causing the inkjet head of the head portion 12 to carry out the sub-scanning operation.

Furthermore, in the present example, the shaping table 14 moves the three-dimensional object 50 to the lid coupling section of the manufacturing apparatus 10 by moving in the horizontal direction (Y direction in the figure) with the three-dimensional object 50 being shaped mounted thereon at a predetermined timing during the shaping. For example, the shaping table 14 moves the three-dimensional object 50 to the lid coupling section by moving to a position shown with a broken line in the figure.

The head driver 16 is a driver for moving the head portion 12 in a direction within a plane orthogonal to the up and down direction. In the present example, the head driver 16 causes the head portion 12 to carry out a main scanning operation of discharging ink droplets while moving in a main scanning direction (Y direction in the figure) set in advance. In this case, causing the head portion 12 to carry out the main scanning operation means causing the inkjet head of the head portion 12 to carry out the main scanning operation. Furthermore, in a variant of the configuration of the manufacturing apparatus 10, the head driver 16 may cause the head portion 12 to carry out the sub-scanning operation. In this case, the head driver 16 causes the head portion 12 to carry out the sub-scanning operation by moving the head portion 12 side in the sub-scanning direction with respect to the shaping table 14 which position is fixed.

The cutting table 18 is a table for supporting the lid member 60 at the time of cutting the lid member 60, is arranged in the lid cutting section of the manufacturing apparatus 10, and supports the lid member 60 by mounting the lid member 60 on the upper surface. In this case, cutting the lid member 60 means cutting the lid member 60 to a shape set according to the shape of the three-dimensional object 50 to be shaped. Furthermore, the shape of the lid member 60 is set in accordance with the position to install the lid member 60 in the interior of the three-dimensional object 50. A manner of installing the lid member 60, and the like will be described in more detail later.

The cutter 20 is a cutting device for cutting the lid member 60, and is arranged at a position facing the cutting table 18 in the lid cutting section. Furthermore, in the present example, the cutter 20 has a configuration of being able to move in the Z direction and move within the XY plane, and for example, cuts the lid member 60 to a shape set in advance in response to an instruction of the controller of the manufacturing apparatus 10.

As described above, the manufacturing apparatus 10 prepares the lid member 60 having a necessary shape by cutting the lid member 60 with the cutter 20. In a variant of the configuration of the manufacturing apparatus 10, for example, the lid member 60 prepared in advance before the start of shaping, and the like may be used rather than preparing the lid member 60 during the shaping operation. In this case, the lid member 60 may be prepared in advance based on the shaping data or may be a plurality of shaped lid members 60 smaller than a shaping data range.

The adsorption unit 22 is a member for moving the member held by adsorption, and adsorbs the lid member 60 cut with the cutter 20 on the cutting table 18 and moves the same to the lid coupling section in the manufacturing apparatus 10. The adsorption unit 22 further releases the lid member 60 on the three-dimensional object 50 being shaped, which has been moved to the lid coupling section while being mounted on the shaping table 14, to install the lid member 60 on the shaping surface of the three-dimensional object 50. In this case, the shaping surface of the three-dimensional object 50 is the upper surface of a layer at the uppermost part formed at this point in the three-dimensional object 50. The operation of installing the lid member 60 on the three-dimensional object 50 will be described in more detail later.

After the lid member 60 is installed on the three-dimensional object 50 being shaped, the shaping table 14 is moved to the shaping section in the manufacturing apparatus 10. The head portion 12 further forms a layer on the lid member 60. When further mounting the lid member 60 after forming a predetermined number of layers, the operations described above are further repeated. According to such configuration, the three-dimensional object 50 can be appropriately shaped.

Now, a more specific configuration of the head portion 12 will be described in more detail. In the present example, the head portion 12 includes a cavity portion material head 302, a support material head 304, and a plurality of ultraviolet light sources 306.

The cavity portion material head 302 and the support material head 304 are inkjet heads that discharge droplets (ink droplets) through the inkjet method. In this case, the ink is, for example, liquid discharged through the inkjet method. A known inkjet head, for example, can be suitably used for the cavity portion material head 302 and the support material head 304. Furthermore, in the present example, the cavity portion material head 302 and the support material head 304 include a nozzle row in which a plurality of nozzles are lined in a predetermined nozzle row direction (e.g., X direction in the figure).

The cavity portion material head 302 is an inkjet head that discharges a droplet of a cavity portion material used for the shaping of the three-dimensional object 50. In this case, for example, a known shaping ink (shaping material), and the like can be suitably used for the cavity portion material. Furthermore, in the present example, an ultraviolet curable ink that cures when irradiated with an ultraviolet light, for example, shaping ink, transparent ink, white ink, process color ink, and the like may be used for the cavity portion material.

Furthermore, the cavity portion material head 302 forms a cavity portion material layer by discharging the droplet of the cavity portion material. In this case, the cavity portion material layer is a layer (layer of ink) formed with the cavity portion material. In the present example, the cavity portion material head 302 shapes the three-dimensional object 50, which interiorly includes a cavity, by layering a plurality of cavity portion material layers. The shape of the three-dimensional object 50 interiorly including the cavity will be described in more detail later.

The support material head 304 is an inkjet head that discharges a droplet of a support material, which is the material of the support layer supporting the periphery of the three-dimensional object 50 being shaped. In this case, the material of a known support layer can be suitably used for the material of the support layer.

The support layer is removed after the shaping of the three-dimensional object 50 is completed. Thus, a material that can be removed without influencing the cavity portion material layer in the three-dimensional object 50 is preferably used for the material of the support layer. For example, a water soluble material that can be dissolved in water after the shaping of the three-dimensional object 50 is preferably used for the material of the support layer. Furthermore, in this case, more specifically, use of an ultraviolet curable ink which has weaker cure degree by the ultraviolet light and can be easily decomposed than the cavity portion material configuring the cavity portion material layer, and the like for the material of the support layer is considered. In FIG. 1(a), the three-dimensional object 50 is illustrated in a state including the support layer for the sake of convenience of illustration. A specific shape of the support layer will be described in further detail later with a specific shape of the three-dimensional object 50.

The plurality of ultraviolet light sources 306 are curing device for curing the ink, and generate an ultraviolet light for curing the ultraviolet curable ink. For example, ultraviolet LED: Ultra Violet Light Emitting Diode (UVLED), and the like can be suitably used for the ultraviolet light source 306. Use of a metal halide lamp, a mercury lamp, and the like for the ultraviolet light source 306 is also considered. In the present example, each of the plurality of ultraviolet light sources 306 is arranged at one end side and another end side in the main scanning direction (Y direction) in the head portion 12 so as to sandwich the cavity portion material head 302 and the support material head 304 in between.

The three-dimensional object 50 can be appropriately shaped by using the above configuration. More specifically, the cavity portion material layer configuring the three-dimensional object 50 can be appropriately shaped by using the cavity portion material head 302. The support layer for supporting the three-dimensional object 50 being shaped can be appropriately formed by using the support material head 304. Furthermore, the cavity portion material layer, and the like can be appropriately cured by using the ultraviolet light source 306.

The head portion 12 may further have a configuration other than the above. For example, when shaping the colored three-dimensional object 50, the head portion 12 may further include an inkjet head for discharging an ink droplet of a chromatic color for coloring, a head for discharging a white ink droplet necessary for coloring in the subtractive color mixture, and the like. Furthermore, the head portion 12 may further include a flattening device (e.g., flattening roller, etc.) for flattening the cavity portion material layer and the support layer during the shaping between the inkjet head and the ultraviolet light source 306 (see FIG. 9).

Next, the shape of the three-dimensional object 50 to shape in the present example will be described in further detail. As described above, in the present example, the manufacturing apparatus 10 shapes the three-dimensional object 50 interiorly including the cavity. Furthermore, the manufacturing apparatus 10 forms the support layer at the periphery of the three-dimensional object 50, as necessary, during the shaping. Moreover, in the present example, the manufacturing apparatus 10 carries out the shaping of the three-dimensional object 50 by further using the lid member 60 other than the cavity portion material and the material for the support layer.

Figure 2A:
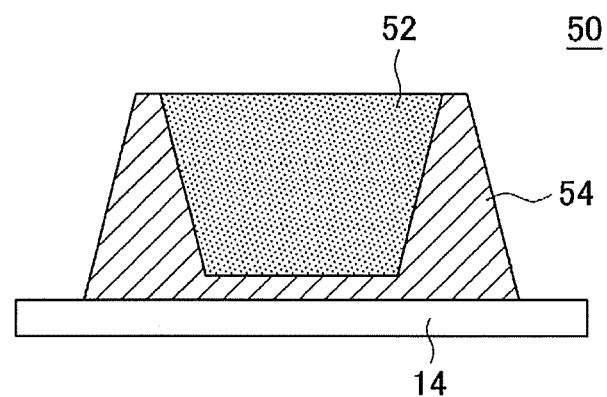
FIG. 2(a) and FIG. 2(b) are views describing one example of a shape of a three-dimensional object to be shaped in the present example.
Figure 2B:
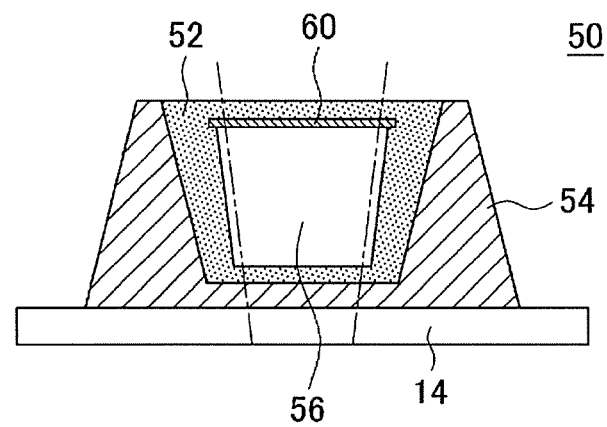

FIG. 2(a) and FIG. 2(b) are views describing one example of a shape of the three-dimensional object 50 to shape in the present example. First, the shape of the three-dimensional object 50 in the case of shaping through a conventional method will be hereinafter described for the sake of convenience of explanation.

FIG. 2(a) shows one example of a shape of the three-dimensional object 50 shaped through the conventional method. When the three-dimensional object 50 is shaped through the conventional method, the cavity usually does not exist in the interior of the three-dimensional object 50, and a shaped object 52 of the three-dimensional object 50 has a configuration in which the interior is solid as in the illustrated configuration. In this case, the shaped object 52 of the three-dimensional object 50 is a region formed with the material for shaping. During the operation of shaping, the support portion 54, in which the support layers are layered, is formed, as necessary, at the periphery of the shaped object 52. The shaped object 52 of FIG. 2(a) has an overhanging shape spread in a plane direction from the bottom to the top, and thus the support layer is necessary to enable shaping.

Next, the three-dimensional object 50 shaped by the manufacturing apparatus 10 of the present example will be described. FIG. 2(b) shows one example of a shape of the three-dimensional object 50 shaped by the manufacturing apparatus 10 of the present example. In this case as well, the manufacturing apparatus 10, for example, forms the shaped object 52 in the three-dimensional object 50 while supporting the periphery with the support portion 54, as necessary. As described above, in the present example, the manufacturing apparatus 10 shapes the three-dimensional object 50 interiorly including the cavity 56. In this case, interiorly including the cavity 56 means, for example, that the interior of the shaped object 52 is hollow (hollow space) as in the illustrated configuration. Furthermore, in the present example, the lid member 60 is installed on the cavity 56 of the three-dimensional object 50. The cavity portion material layer is further formed on the lid member 60.

In the present example, the lid member 60 is one example of a sandwiching member, which is a member arranged with at least one part sandwiched between the plurality of material layers (cavity portion material layer). As will be described in further detail later, in the present example, the three-dimensional object 50 is shaped by carrying out a cavity portion material layer forming step, a sandwiching member installing step, and a material layer-on-sandwiching member forming step.

In this case, the cavity portion material layer forming step is a step for forming the cavity portion material layer under the lid member 60, where in the shaping section of the manufacturing apparatus 10, the droplet of the cavity portion material is discharged from the cavity portion material head 302 (see FIG. 1(a) and FIG. 1(b)) of the head portion 12 to form the cavity portion material layer configuring the periphery of at least one part of the cavity 56 in the three-dimensional object 50.

Furthermore, the sandwiching member installing stage is a step for installing the lid member 60 on the cavity portion material layer formed in the cavity portion material layer foiling step, where in the lid coupling section of the manufacturing apparatus 10, the lid member 60 is installed on the shaping surface of the three-dimensional object 50 being shaped by the adsorption unit 22 (see FIG. 1(a) and FIG. 1(b)). In this case, the adsorption unit 22 functions as a sandwiching member installer. The installation of the lid member 60 is not necessarily limited to being automatically carried out using the adsorption unit 22, and the like, and consideration is also made to carry out the installation through a manual work of an operator, and the like while temporarily stopping the shaping of the manufacturing apparatus 10.

Furthermore, the material layer-on-sandwiching member forming step is a step for forming the material layer on the lid member 60, where in the shaping section of the manufacturing apparatus 10, the droplet of the cavity portion material is discharged from the cavity portion material head 302 to at least one part of the lid member 60 to form the cavity portion material layer on the lid member 60. In this case, the cavity portion material layer formed on the lid member 60 may be a material layer that covers the upper side of the cavity 56 with the lid member 60 in between.

In the present example, the manufacturing apparatus 10, for example, shapes the three-dimensional object 50 in which at least one part in the cavity 56 is overhanging. When referring to at least one part in the cavity 56 overhanging, this means, for example, that at least one part of an inner wall of the three-dimensional object 50 surrounding the cavity 56 in the three-dimensional object 50 after the completion of the shaping has an overhanging shape where a portion on an upper side in a direction of gravitational force is projecting out toward the inner side of the cavity 56. The inner wall surrounding the cavity 56 is a wall surface (side surface) formed by the respective inner peripheral ends of a plurality of cavity portion material layers layered so as to surround the cavity 56.

More specifically, when referring to the inner wall having an overhanging shape, this means that for at least one part of the inner wall, at least one part of the inner peripheral end of the cavity portion material layer on the upper side is projecting out toward the inner side than the cavity portion material layer on the lower side. When referring to the inner wall having an overhanging shape, an angle formed by the inner wall (cavity side surface) with respect to the horizontal surface (e.g., bottom of cavity, etc.) may be greater than or equal to a right angle. In this case, the angle formed by the inner wall with respect to the horizontal surface is an inclined angle of a surface configuring the inner wall. Furthermore, in the configuration shown in FIG. 2(*b*), an area where the upper part of the cavity 56 is covered with the cavity portion material layer formed on the lid member 60 can be considered as the overhanging portion.

Here, when the inner wall surrounding the cavity 56 has an overhanging shape in the three-dimensional object 50 in the middle of being shaped, it is difficult to appropriately form the shape (curved surface, etc.) of the inner wall by merely layering the cavity portion material layer. For example, in the case of the configuration shown in FIG. 2(*b*), it is difficult to appropriately form a portion covering the upper part of the cavity 56 by merely layering the cavity portion material layer without using the lid member 60.

In the present example, on the other hand, the adsorption unit 22 installs the lid member 60 at the position to form the inner wall to the overhanging shape in the sandwiching member installing step. In this case, installing the lid member 60 at the position to form the inner wall to the overhanging shape means installing the lid member 60 at a position where at least one part of the cavity portion material layer on the upper side of the lid member 60 projects out to the inner side of the cavity 56 than the cavity portion material layer on the lower side.

According to such configuration, the manufacturing apparatus 10 can appropriately form the cavity 56 in the interior of the three-dimensional object 50 even if the inner wall has an overhanging shape. The manufacturing apparatus 10 thus can more appropriately shape the three-dimensional object 50. Furthermore, in this case, the side surface of the inner wall of the cavity 56 is not overhung, that is, needs to be formed with a space in which the upper side is spread.

The cavity portion material layer may be layered without sandwiching the lid member 60 at positions other than the position where the inner wall has the overhanging shape. In this case, the manufacturing apparatus 10 first forms the cavity portion material layer, in which a region corresponding to the cavity 56 is opened, in an overlapping manner to form the shaped object 52 interiorly including a space where the inner wall is not overhanging. The manufacturing apparatus 10 installs the lid member 60 on the upper surface thereof to cover the opening of the space with the lid member 60. The opening of the space is the opening of the cavity 56 formed by this time point. Furthermore, the lid member 60 does not necessarily need to cover the entire opening, and may cover one part of the opening according to the shape of the three-dimensional object 50 to shape. Thereafter, the manufacturing apparatus 10 further forms the material layer (cavity portion material layer) on the lid member 60, and forms the inner wall having the overhanging shape. According to such configuration, the cavity 56 of the three-dimensional object 50 can be appropriately formed. Furthermore, the cavity portion material layer may be layered with the lid member 60 sandwiched in between, as necessary, at one part other than the position where the inner wall has the overhanging shape.

Furthermore, in the present example, use of a member of various raw materials (materials) for the lid member 60 is considered. In this case, the lid member 60 preferably has at least the strength of an extent of withstanding the weight of the cavity portion material to be layered thereon, and flatness and thickness uniformity. In this case, the cavity portion material layer is cured for every one layer, and thus the lid member 60 does not need to have a large strength. For example, even if a flexible lid member 60 is used, the shaping using the lid member 60 can be appropriately carried out by sufficiently ensuring the thickness of the cavity portion material layer. For example, when shaping the three-dimensional object 50 having a height of about 10 cm, consideration is made to have the thickness of the cavity portion material layer to layer on the lid member 60 to about 1 cm. Furthermore, forming a column structure, and the like in the cavity 56, as necessary, and supporting the lid member 60 to enhance the strength are also considered.

Moreover, more specifically, use of a sheet-like member that can be cut with the cutter 20 (see FIG. 1(*a*) and FIG. 1(*b*)) and the like for the raw material of the lid member 60 is considered. Use of a sheet-like film, and the like for the sheet-like member can be considered. More specifically, use of a resin sheet of Polyethylene Terephthalate (PET), acrylic, polyacetal, vinyl chloride, epoxy, polycarbonate, and the like, is considered for such raw material. According to such configuration, a configuration in which the lid member 60 can be easily sandwiched between the cavity portion material layers can be appropriately realized for the lid member 60. Furthermore, as the cutting, and the like of the lid member 60 are facilitated, the shape of the lid member 60 can be easily and appropriately adjusted in accordance with the position to install the lid member 60.

The thickness of the lid member 60 is preferably determined in view of the strength of the three-dimensional object 50 after the shaping, the easiness in cutting, and the like, according to the material. Furthermore, in the manufacturing apparatus 10, the movement (transportation) and installation (fit-in) by the adsorption unit 22 are carried out in the middle of the operation of shaping for the lid member 60. Thus, taking the stability of such operations into consideration, the thickness of the lid member 60 is preferably made to, for example, greater than or equal to 100 µm.

Moreover, the lid member 60 is preferably formed with a material having adhesiveness with respect to the cavity portion material. In this case, having adhesiveness with respect to the cavity portion material means, for example, that when the cavity portion material formed on the lid member 60 is cured, the cavity portion material adheres to the lid member 60 with sufficient adhering strength. According to such configuration, the lid member 60 can be more appropriately fixed between the cavity portion material layers. Thus, the lid member 60 can be prevented from detaching, and the like from between the cavity portion material layers after the completion of the shaping.

Furthermore, in the present example, the ultraviolet curable ink is used for the cavity portion material. Thus, a member formed with a material on which the ultraviolet curable ink fixes when irradiated with the ultraviolet light is preferably used for the lid member 60. In this case, the material on which the ultraviolet curable ink fixes when irradiated with the ultraviolet light means that when irradiated with the ultraviolet light, the ink can be fixed on the material with sufficient adhesiveness. Furthermore, the material on which the ultraviolet curable ink fixes when irradiated with the ultraviolet light may be a material on which printing can be carried out with a printing device using the ultraviolet curable ink. The material on which printing can be carried out with the printing device using the ultraviolet curable ink is a material that does not repel the ultraviolet curable ink.

More specifically, when using the cavity portion material of the ultraviolet curable ink, polyethylene, polypropylene, and the like have weak affinity with respect to the cavity portion material, and the adhesiveness may lower. Thus, in this case, the lid member 60 formed with acrylic, PET, polycarbonate, and the like is preferably used. Furthermore, the lid member 60, and the like formed with foamed polystyrene can be suitably used.

The lid member 60 is also not limited to the sheet-like member, and a plate-like member may be used. In this case, the plate-like member is a member having a strength of an extent of not deflecting by its own weight. In this case, use of a member made from various types of plastics, metal such as stainless steel, plate processed steel plate, and alumina for the lid member 60 is considered. According to such configuration, the strength of the lid member 60 can be more appropriately enhanced. Thus, the cavity portion material layer can be more appropriately formed on the lid member 60. Furthermore, the strength of the entire three-dimensional object 50 can be more appropriately enhanced.

With regard to the manner of installing the lid member 60, in the sandwiching member installing step, the lid member 60 is installed such that the shape of the outer periphery of the lid member 60 becomes greater than the opening of the cavity 56 at the position of installing the lid member 60. The outer periphery of the lid member 60 is an end of the lid member 60 on the outer surface side of the three-dimensional object 50. The opening of the cavity 56 may be an opening of the cavity 56 formed by this time point in the middle of the shaping of the three-dimensional object 50.

Furthermore, a planar member wider than the opening (cavity upper surface) of the cavity 56 is preferably used for the lid member 60. According to such configuration, the opening of the cavity 56 can be more appropriately covered with the lid member 60. Thus, the shaping device 10 can more appropriately form the cavity portion material layer above the lid member 60.

Furthermore, in the sandwiching member installing step, the lid member 60 is preferably installed so that the lid member 60 is hidden in the interior of the three-dimensional object 50 after the completion of the shaping. When referring to the lid member 60 being hidden in the interior of the three-dimensional object 50 after the completion of the shaping, this means, for example, that the outer periphery of the lid member 60 does not run out to the outer side than the cavity portion material layer formed above and below the lid member 60. According to such configuration, the lid member 60 can be appropriately used while preventing the influence on the outer appearance of the three-dimensional object 50.

Moreover, the lid member 60 having the shape and the size corresponding to the shape of the three-dimensional object 50 at the position to install is prepared based on the shaping data indicating the three-dimensional object 50 to shape before the operation of the sandwiching member installing step (e.g., at the time of cutting with the cutter 20, etc.) Thus, the lid member 60 having the necessary size and shape is created based on the shaping data during the operation of shaping. Then, in the sandwiching member installing step, the shaping apparatus 10 installs the created lid member 60 on the shaping surface of the three-dimensional object 50 in the lid coupling section. Furthermore, the lid member 60 having the necessary size and shape does not necessarily need to be prepared during the operation of shaping, and for example, may be prepared before the start of the operation of shaping by the manufacturing apparatus 10. In this case, preparing the necessary lid member 60 in advance based on the shaping data is considered. Furthermore, a plurality of shaped lid members 60 smaller than the shaping data range may be prepared in advance, and a plurality of shaped cavities may be formed. According to such configuration, the shaping apparatus 10 can appropriately install the lid member 60 in the cavity 56 of the three-dimensional object 50.

Figure 3:
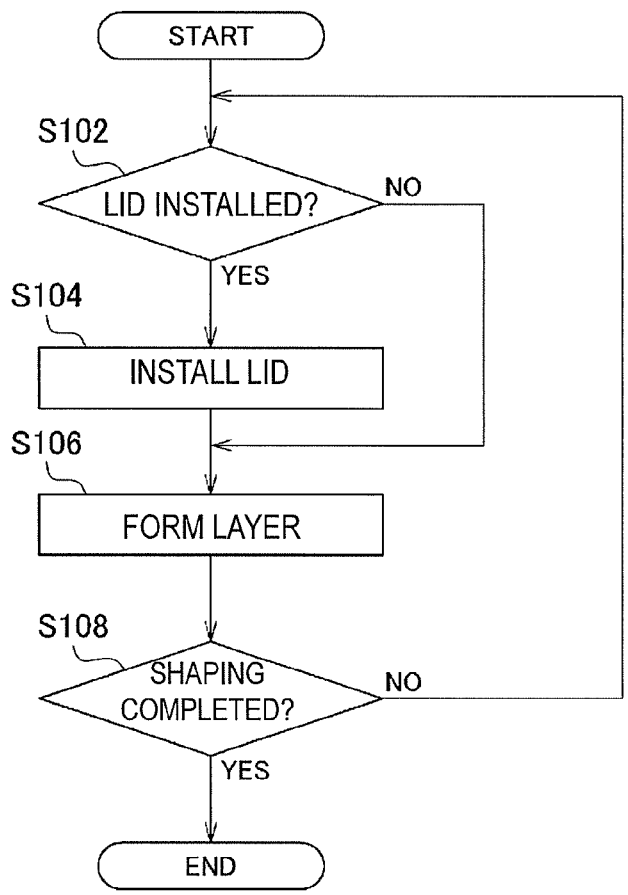
FIG. 3 is a flowchart showing one example of an operation of shaping the three-dimensional object in the present example.

Next, an operation of installing the lid member 60 on the three-dimensional object 50 will be described in more detail. FIG. 3 is a flowchart showing one example of an operation of shaping the three-dimensional object 50 in the present example, and shows one example of an operation of shaping (manufacturing) the three-dimensional object 50 with the shaping apparatus 10. In the present example, the controller of the shaping apparatus 10, for example, sets in advance the position to install the lid member 60 based on the shaping data. In this case, the controller selects a position where the inner wall surrounding the cavity 56 (see FIG. 2(a) and FIG. 2(b)) is overhanging, and sets such position as a position to install the lid member 60. Furthermore, the controller stores the set position in, for example, a storage device.

In the operation of shaping the three-dimensional object 50, for example, the controller of the shaping apparatus 10 determines whether or not the position is a positon to install the lid member 60 before forming each cavity portion material layer to be layered (S102). In this case, the controller of the shaping apparatus 10 carries out such determination based on a position to install the lid member 60 stored in the storage device in advance. When determining as not the position to install the lid member 60 (S102: No), the controller of the shaping apparatus 10 forms one cavity portion material layer with the cavity portion material head 302 (see FIG. 1(a) and FIG. 1(b)) (S106). The controller of the shaping apparatus 10 then cures the formed cavity portion material layer with the ultraviolet light source 306 (see FIG. 1(a) and FIG. 1(b)). Furthermore, the controller of the shaping apparatus 10 forms one support layer with the support material head 304 (see FIG. 1(a) and FIG. 1(b)), as necessary.

On the other hand, for example, when determining as the position to install the lid member 60 (S102: Yes) in forming a next layer at the position where the inner wall has an overhanging shape, and the like, the controller of the shaping apparatus 10 transports the lid member 60 from the cutting table 18 (see FIG. 1(a) and FIG. 1(b)) using the adsorption unit 22 (see FIG. 1(a) and FIG. 1(b)) and installs the lid member 60 on the shaping surface of the three-dimensional object 50 (S104). Thereafter, the controller of the manufacturing apparatus 10 carries out the operation of S106, similar to the description made above, and forms one cavity portion material layer and forms the support layer, as necessary.

When the operation of shaping is completed with the formation of such layer (S108: Yes), the operation is terminated, and the shaping of the three-dimensional object 50 is completed. In this case, the operation of removing the support layer by washing with water, and the like may be further carried out thereafter, as necessary. Furthermore, when the shaping is not yet completed, and the cavity portion material layer, and the like are to be further formed, the process returns to S102, and the subsequent operations are repeated.

In the operations described above, the operation of S104 of installing the lid member 60 corresponds to the sandwiching member installing step. Furthermore, the operation of S106 of forming the cavity portion material layer immediately after installing the lid member 60 by the operation of S106 corresponds to the operation of the material layer-on-sandwiching member forming step. Furthermore, the operation of S106 of forming the cavity portion material layer immediately before the operation of S104 of installing the lid member 60 corresponds to the operation of the cavity portion material layer forming step. In this case, the operation of S106 of forming the cavity portion material layer immediately before the operation of S104 of installing the lid member 60 is, for example, the operation of S106 in a loop before a loop (repeating operations of S102 to S108) of determining as the position to install the lid member 60 in S102. Furthermore, in the operation of S106, the cavity portion material layer configuring the periphery of at least one part of the cavity 56 in the three-dimensional object 50 is formed, as described above.

According to the present example, the manufacturing apparatus 10 can appropriately shape the three-dimensional object 50 through the layering and shaping method, which is a layering method of sequentially layering the cavity portion material layer to form a three-dimensional structural object. In this case, the cavity 56 of various shapes can be appropriately formed in the interior of the three-dimensional object 50 by sandwiching the lid member 60 in the middle of layering the cavity portion material layers. For example, forming the cavity portion material layer so as to cover at least one part of the opening of the cavity 56 is considered. Furthermore, the inner wall of the cavity 56 can be appropriately formed to the overhanging form of various shapes even at the position other than the position of covering the opening of the cavity 56 at the uppermost part of the cavity 56.

Thus, according to the present example, the three-dimensional object 50 interiorly including the cavity 56 can be more appropriately shaped. Thus, the usage amount of the material can be reduced, and the weight of the three-dimensional object 50 can be appropriately reduced. Furthermore, at the time of the shaping operation, the trouble of refilling the material, and the like can be reduced, and the trouble required for the work of shaping can be reduced. Moreover, with the reduction in the usage amount of the material, the cost of shaping can also be suppressed.

Furthermore, in this case, the strength of the shaped object 52 can be enhanced, and the like by overlapping the plurality of cavity portion material layers with the lid member 60 sandwiched between the cavity portion material layers. For example, a function of a framework of the shaped object 52 can be given to the lid member 60 by using the lid member 60 having a strength of a certain extent or greater, so that the strength of the shaped object 52 can be appropriately enhanced. The strength of the shaped object 52 thus can be appropriately suppressed from lowering by forming the cavity 56. In this case, the strength of the lid member 60 is preferably set to a strength capable of supporting at least one cavity portion material layer formed on the lid member 60, and the like. Moreover, the strength of the lid member 60 is preferably set to a strength of an extent not being deflected by its own weight.

Figure 4A:
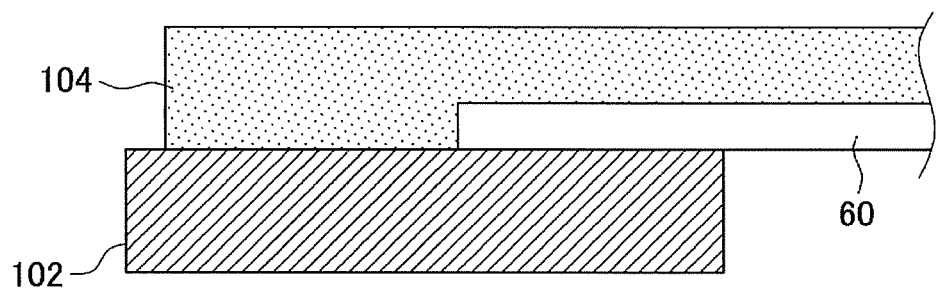
FIG. 4(a) to FIG. 4(c) are views describing a specific example of a thickness of a lid member.
Figure 4B:
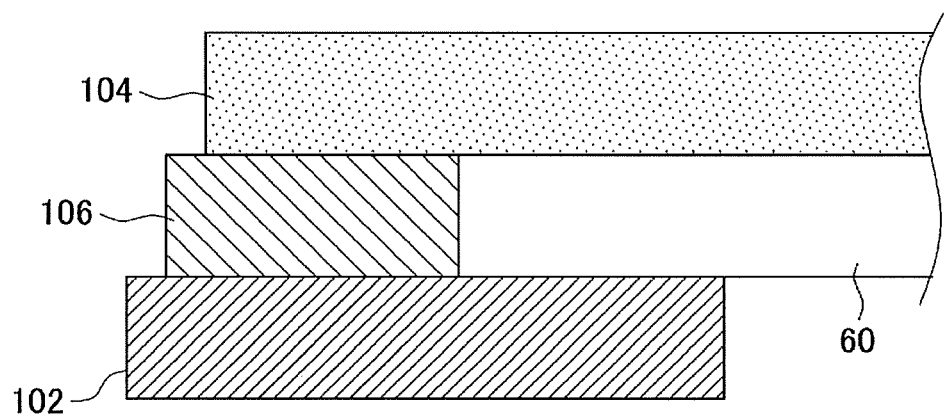
Figure 4C:
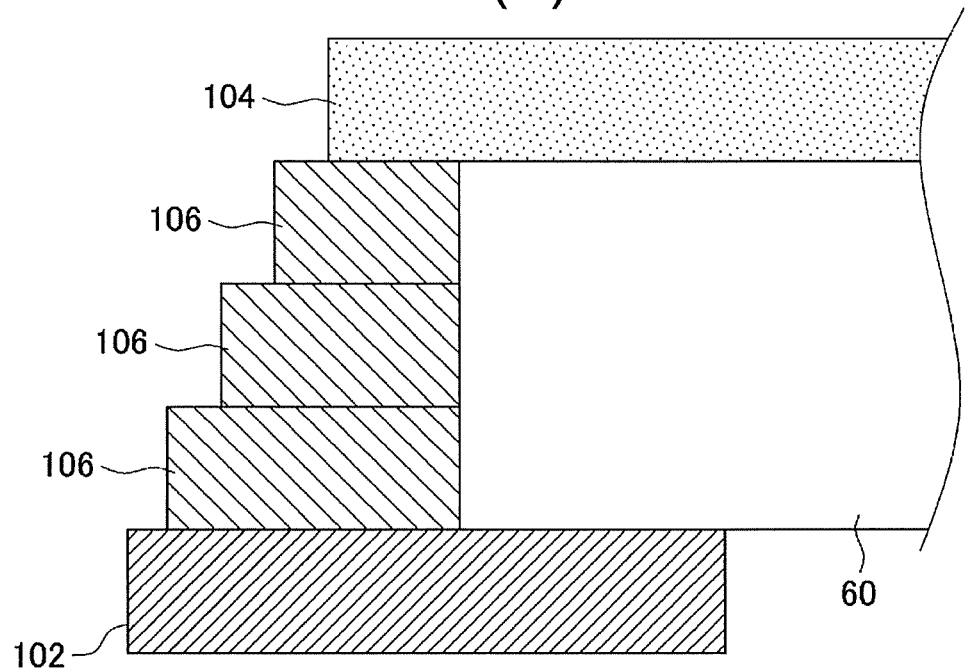

Next, a more specific shape of the three-dimensional object 50 and a variant of the configuration of the three-dimensional object 50 will be described. FIGS. 4(a) to 4(c) are views describing a specific example of the thickness of the lid member 60.

As described above, the thickness of the lid member 60 is preferably determined in view of, for example, the material of the lid member 60, the strength of the three-dimensional object 50 after the shaping, the easiness in the cutting of the lid member 60, and the like. Furthermore, at the time of shaping the three-dimensional object 50, consideration is made to appropriately set one material layer (cavity portion material layer) according to the property of the material to use and the required accuracy of shaping. Thus, consideration is made to variously set the magnitude relationship of the thickness of the lid member 60 and one material layer.

FIG. 4(a) shows an example of the case when the lid member 60 is thinner than one cavity portion material layer. In this case, the lid member 60 is, for example, arranged with being sandwiched between two successively layered cavity portion material layers.

In this case, in the cavity portion material forming step carried out at the time of the shaping, the manufacturing apparatus 10 forms a lower layer 102, which is a cavity portion material layer on the lower side of the lid member 60. Furthermore, in the sandwiching member installing step, the manufacturing apparatus 10 installs the lid member 60 on the lower layer 102. Then, in the material layer-on-sandwiching member forming step, the manufacturing apparatus 10 forms an upper layer 104, which is a layer on an upper side of the lid member 60, on the lower layer 102 while sandwiching the lid member 60 in between. According to such configuration, the manufacturing apparatus 10 can appropriately install the lid member 60 between the plurality of cavity portion material layers.

When referring to forming the upper layer 104 on the lower layer 102 while sandwiching the lid member 60 in between, this may mean that the lid member 60 is sandwiched between the upper layer 104 and the lower layer 102 in a region of one part of the upper layer 104, as shown in the figure. Furthermore, a region directly overlapped on the lower layer 102 and a region formed on the lid member 60 are produced in the upper layer 104. As a result, a step difference by the thickness of the lid member 60 may generate at a boundary portion of the upper and lower layers if the upper layer 104 is merely formed. Thus, in this case, in the manufacturing apparatus 10, the layer is preferably flattened using, for example, a flattening device such as a flattening roller when forming the upper layer 104.

FIG. 4(b) shows an example of the case when the thickness of one cavity portion material layer and the thickness of the lid member 60 are equal. In this case, the lid member 60 is arranged with being sandwiched between two cavity portion material layers spaced apart with one intermediate layer 106 sandwiched between the cavity portion material layers.

In this case, in the cavity portion material layer forming step carried out at the time of the shaping, the manufacturing apparatus 10 forms the lower layer 102 same as or similar to the case shown using FIG. 4(a). Furthermore, in the sandwiching member installing step, the manufacturing apparatus 10 installs the lid member 60 on the lower layer 102.

Thereafter, the manufacturing apparatus 10 further forms the intermediate layer 106, which is a cavity portion material layer having the same thickness as the lid member 60, in a region of the outer periphery surrounding the lid member 60 before forming the upper layer 104.

The thickness of the intermediate layer 106 may be, for example, a thickness obtained after carrying out flattening with the flattening device such as the flattening roller. In this case, for example, after forming the intermediate layer 106 thicker than the lid member 60, it may be flattened before being cured so that the thickness of the lid member 60 and the thickness of the intermediate layer 106 become equal. The intermediate layer 106 may be formed, for example, before installing the lid member 60.

In the material layer-on-sandwiching member forming step, the manufacturing apparatus 10 forms the upper layer 104 on the intermediate layer 106 and the lid member 60. According to such configuration as well, for example, the lid member 60 can be appropriately installed between the plurality of cavity portion material layers.

The thickness of the lid member 60 may be thicker than the thickness of one cavity portion material layer. FIG. 4(c) shows an example of the case when the lid member 60 is thicker than one cavity portion material layer. In this case, the lid member 60 is arranged with being sandwiched between two cavity portion material layers spaced apart with a plurality of cavity portion material layers sandwiched in between.

In this case, in the cavity portion material layer forming step carried out at the time of the shaping, the manufacturing apparatus 10 forms the lower layer 102 same as or similar to the case shown using FIG. 4(a) and the like. Furthermore, in the sandwiching member installing step, the manufacturing apparatus 10 installs the lid member 60 on the lower layer 102. Thereafter, the manufacturing apparatus 10 forms a plurality of cavity portion material layers corresponding to the thickness of the lid member 60 as the intermediate layer 106 in a region of the outer periphery surrounding the lid member 60 before forming the upper layer 104.

In this case, the thickness of a plurality of intermediate layers 106 after carrying out flattening with the flattening device such as the flattening roller is to be made equal to the thickness of the lid member 60. The intermediate layer 106 may be formed before installing the lid member 60.

In this case as well, in the material layer-on-sandwiching member forming step, the manufacturing apparatus 10 forms the upper layer 104 on the intermediate layer 106 and the lid member 60. According to such configuration as well, for example, the lid member 60 can be appropriately installed between the plurality of cavity portion material layers.

Next, a variant of the configuration of the three-dimensional object 50 shaped by the manufacturing apparatus 10 of the present example will be described. In FIG. 2(a) and FIG. 2(b), the configuration of the three-dimensional object 50 of the case when the lid member 60 is installed only at a position of the uppermost part in the cavity 56 of the three-dimensional object 50 has been described. However, the specific shape of the three-dimensional object 50 is not limited to such configuration, and various modifications can be made.

FIGS. 5(a), 5(b), 6(a), 6(b) and 6(c) are views describing a variant of the three-dimensional object 50. Other than the points described below, in FIGS. 5(a), 5(b), 6(a), 6(b) and 6(c), the configuration denoted with the same reference number as FIGS. 1(a) to 4(c) have the same or similar feature as the configuration in FIGS. 1(a) to 4(c).

Figure 5A:
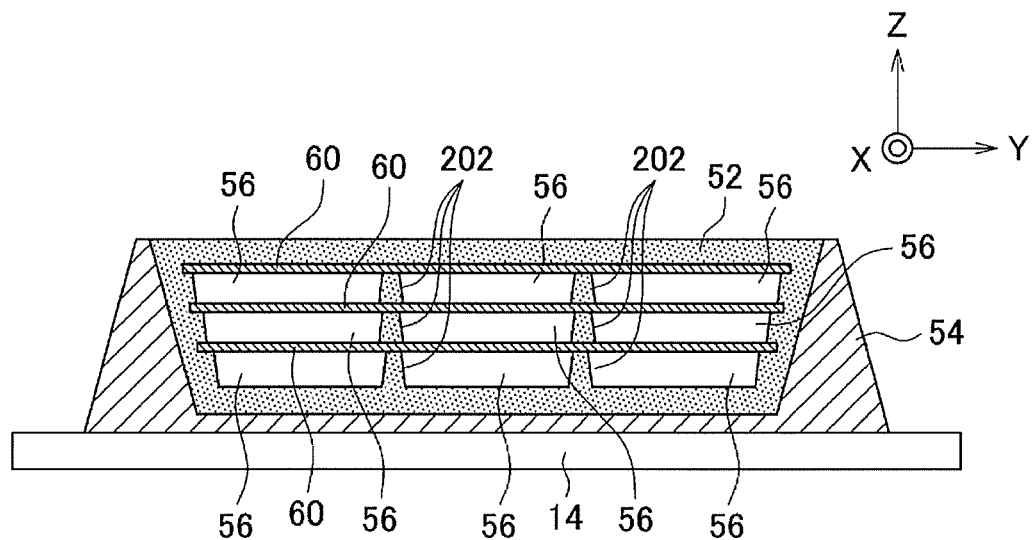
FIG. 5(a) and FIG. 5(b) are views describing a variant of the three-dimensional object.

FIG. 5(a) shows a configuration of the variant of the three-dimensional object 50. In the present variant, the three-dimensional object 50 includes a plurality of divided cavities 56 in the shaped object 52. More specifically, the shaped object 52 is shaped using a plurality of lid members 60. Thus, in the shaped object 52 of the three-dimensional object 50, the plurality of cavities 56 lined with the lid member 60 sandwiched between the cavity portion materials are formed. In this case, the plurality of cavities 56 are separated by the lid member 60 in the up and down direction (Z direction).

A plurality of columnar portions 202 are also formed under each lid member 60. Each of the plurality of columnar portions 202 is a columnar portion (column structure) formed by the material for shaping (cavity portion material), and supports the lid member 60 by making contact with one part of the lower surface of the lid member 60. Among the plurality of columnar portions 202, the columnar portion 202 supporting the lid member 60 at the most bottom is continuously formed from a lower region of the shaped object 52. Furthermore, the columnar portion 202 supporting the lid member 60 other than the one at the most bottom is formed on the lid member 60 at the further bottom according to the position of the lid member 60 to support.

According to the present variant, the plurality of cavities 56 lined in a three-dimensional direction can be appropriately formed in the three-dimensional object 50. In this case, the strength of the three-dimensional object 50 can be enhanced compared to when forming one large cavity 56. More specifically, the strength in the longitudinal direction (up and down direction) can be appropriately enhanced by forming the columnar portion 202. Furthermore, the strength in the lateral direction can also be enhanced by using a plurality of lid members 60 having a strength of a certain extent or greater. Thus, even when the size of the three-dimensional object 50 is large, the cavity 56 can be appropriately formed in the three-dimensional object 50 while reinforcing the strength with the columnar portion 202 and the lid member 60. Moreover, in the present variant as well, the side surface of the inner wall of the individual cavity 56 does not overhang including the side surface of the columnar portion 202, that is, forms a space in which the upper side is spread, similar to FIG. 2(b).

Considering only the point of forming the cavity 56 while reinforcing, it may first appear that only the columnar portion 202 needs to be formed without using the lid member 60. In this case, however, the opening of the cavity 56 cannot be covered. Furthermore, it becomes difficult to faun the inner wall of the cavity 56 to an overhanging shape. Thus, the shape of the three-dimensional object 50 that can be formed is limited if only the columnar portion 202 is merely formed. In the present variant, on the other hand, the lid member 60 is used similar to the case described using FIGS. 1(a) to 4(c). Thus, when configured as described above, the three-dimensional object 50 of various shapes can be appropriately shaped while interiorly forming the cavity 56.

Figure 5B:
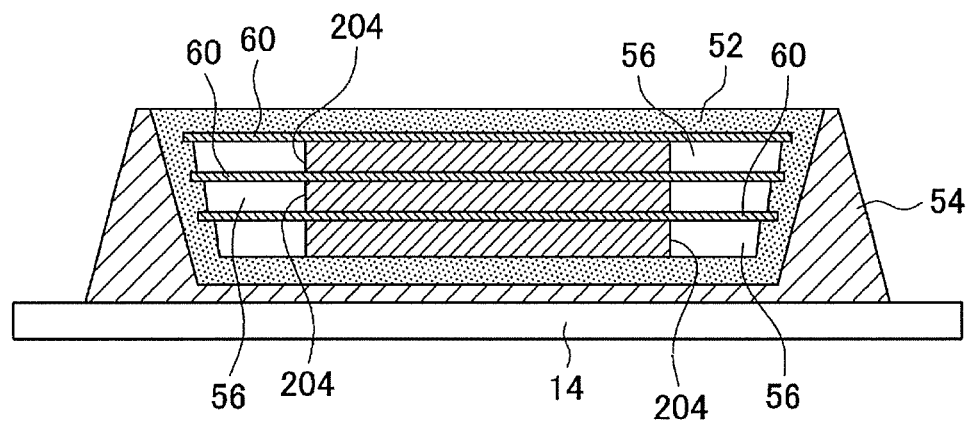
Figures 6A, 6B, 6C:
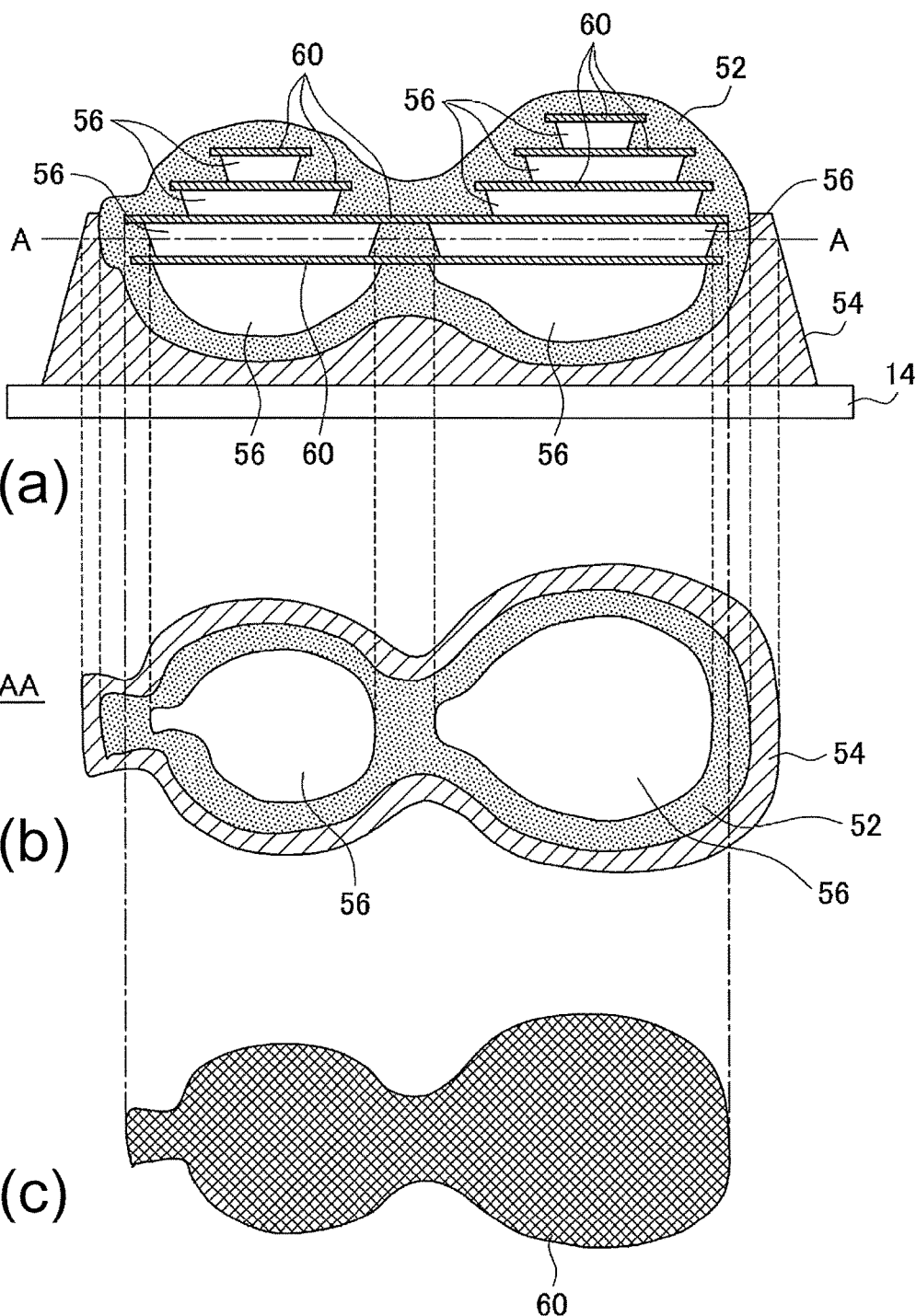
FIG. 6(a) to FIG. 6(c) are views showing a configuration of a further variant of the three-dimensional object.
Figure 7A:
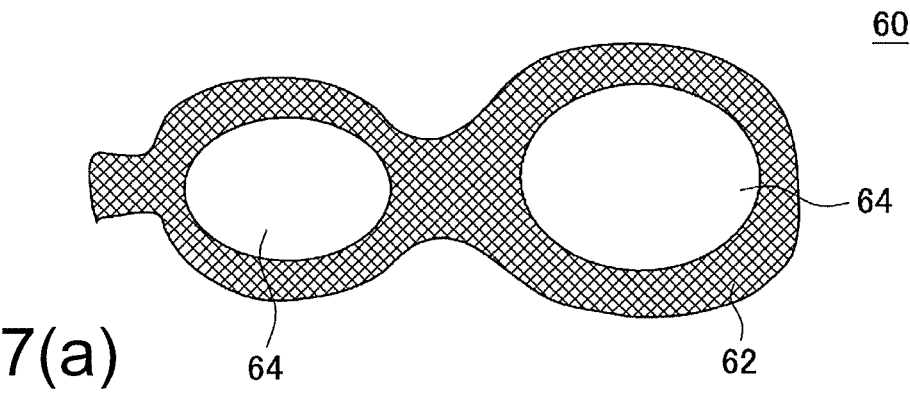
FIG. 7(a) to FIG. 7(d) are views describing a further variant of the lid member and the three-dimensional object.
Figure 7B:
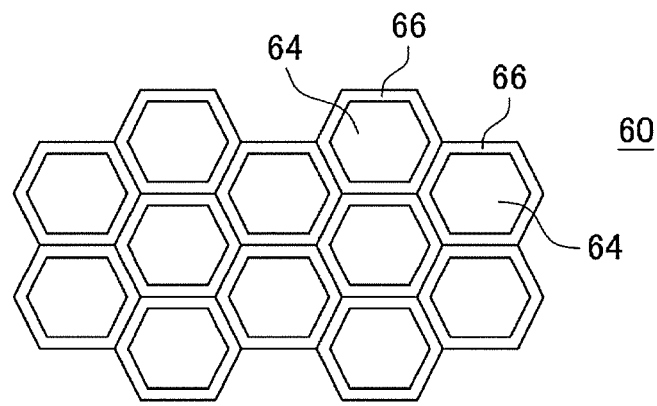
Figure 7C:
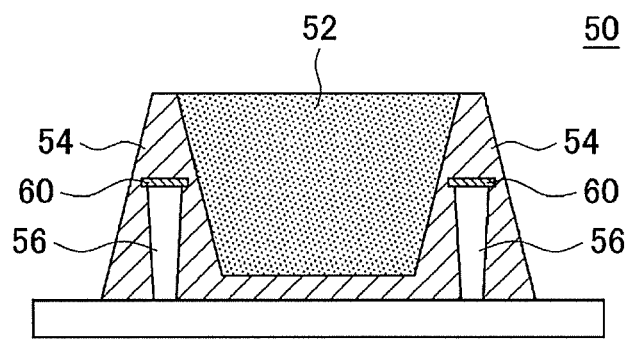
Figure 7D:
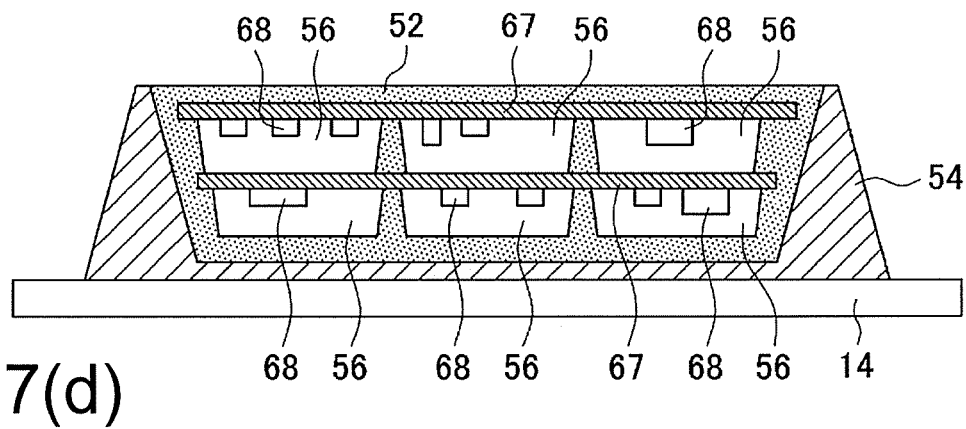

FIG. 5(b) shows a configuration of a further variant of the three-dimensional object 50. In the present variant, each lid member 60 is supported using not the columnar portion 202 but a lid supporting member 204. The lid supporting member 204 is a member formed to have a thickness corresponding to the height of the cavity 56, and supports the lower surface of the lid member 60 installed on the cavity 56 by being installed in the cavity 56. According to such configuration, the lid member 60 can be appropriately supported.

Furthermore, the strength of the three-dimensional object 50 can be more appropriately enhanced.

A plate-like or a table-like member can be suitably used for the lid supporting member 204. Furthermore, the lid supporting member 204 may be installed in a region of one part of the cavity 56, as in the illustrated configuration. Moreover, a member formed with a raw material having a lower specific weight than the cavity portion material configuring the shaped object 52 is preferably used for the lid supporting member 204. According to such configuration, for example, the weight of the three-dimensional object 50 after the completion of shaping can be appropriately suppressed. Furthermore, a member formed with an inexpensive raw material than the cavity portion material is more preferred for the lid supporting member 204. According to such configuration, the rise in cost of the three-dimensional object 50 can be appropriately suppressed.

Consideration is also made to use a member formed with a foamed polystyrene, and the like for the lid supporting member 204. In FIG. 5(*b*) illustrates a case of using the lid supporting member 204 formed to have a thickness corresponding to the height of the respective cavity 56 with respect to each of the plurality of cavities 56 formed using the plurality of lid members 60. A configuration of the case when one lid supporting member 204 is installed in each cavity 56 is illustrated.

However, in a further variant of the three-dimensional object 50, consideration is made to further change the manner of supporting the lid member 60. In this case, a plurality of lid supporting members 204 may be installed in each cavity 56. Consideration is also made to, for example, fill the cavity 56 with foamed polystyrene rather than using the lid supporting member 204 formed to have the thickness corresponding to the height of the cavity 56.

With regard to the configuration of the three-dimensional object 50, the shaping in more complex and various shapes can be carried out while interiorly forming the cavity 56 by using the plurality of lid members 60. FIGS. 6(*a*) to 6(*c*) show a configuration of a further variant of the three-dimensional object 50. FIG. 6(*a*) is a perpendicular cross-sectional view of the three-dimensional object 50. FIG. 6(*b*) is an AA cross-sectional view of the three-dimensional object 50. FIG. 6(*c*) shows a shape of the lid member 60 installed on the AA cross section.

As shown in the figure, in the present variant, a plurality of cavities 56 lined in the up and down direction (longitudinal direction) are formed in plural sets in the shaped object 52 of the three-dimensional object 50 by forming the plurality of cavities 56 divided by the lid member 60 in accordance with the shape of the three-dimensional object 50 to be shaped. According to such configuration, for example, the cavity 56 can be appropriately formed even with respect to the three-dimensional object 50 having a more complex shape.

Furthermore, in this case, the outer surface shape of the three-dimensional object 50 can be formed to various shapes by forming the support portion 54 at the periphery of the three-dimensional object 50. In this case, the support portion 54 merely needs to be formed to the required height. For example, in the case of the configuration shown in FIGS. 6(*a*) to 6(*c*), the support portion 54 may be formed within a range in which the overhanging shape exists in the wall surface of the outer periphery. According to such configuration, the three-dimensional object 50 can be appropriately formed.

Furthermore, in the description made above, the shape of the lid member 60 has been mainly described for the case of covering the entire opening of the cavity 56. However, the shape of the lid member 60 is not necessarily limited to such shape, and may be a shape that covers only the necessary region. In this case, for example, use of the lid member 60 having a shape that covers only the region where the cavity portion material layer is to be formed at least thereon is considered.

FIGS. 7(*a*) to 7(*d*) are views describing a further variant of the lid member 60 and the three-dimensional object 50. Other than the points described below, in FIGS. 7(*a*) to 7(*d*), the configuration denoted with the same reference number as FIGS. 1(*a*) to 6(*c*) have the same or similar feature as the configuration in FIGS. 1(*a*) to 6(*c*).

FIG. 7(*a*) shows a configuration of a variant of the lid member 60. As described above, the shape of the lid member 60 may be a shape that covers only the necessary region in the cavity 56 of the three-dimensional object 50. More specifically, in this case, for example, consideration is made to use the lid member 60 that includes a covering portion 62 surrounding a hole portion 64, and that covers the cavity 56 with the covering portion 62, as shown in FIG. 7(*a*). In this case as well, the three-dimensional object 50 can be appropriately shaped using the lid member 60 by forming the covering portion 62 in a region placed on the cavity portion material layer on the lower side and where the cavity portion material layer is to be formed at least thereon. Furthermore, consideration is made to have the shape of the lid member 60, more generally, to a frame shape, ring shape, doughnut shape, and the like.

In the description made above, a case of using the member which is entirely connected in a uniform state has been mainly described with regard to the lid member 60. However, consideration is also made to use a configuration in which the lid member 60 is formed to a desired shape by, for example, combining smaller members having a predetermined shape.

FIG. 7(*b*) shows a configuration of a variant of the lid member 60. In this case, the lid member 60 is formed by combining a plurality of unit members 66 of a predetermined shape. In the illustrated case, the unit member 66 is a hexagonal frame-shaped member having the hole portion 64 at the middle, and are lined with the respective sides joined to each other to configure the lid member 60 of a honeycomb structure. When configured in such manner as well, the lid member 60 of various shapes can be appropriately shaped. Furthermore, the lid member 60 of various shapes thus can be appropriately used in correspondence with the opening of the cavity 56 in the three-dimensional object 50.

The shape of the unit member 66 is not limited to the hexagonal member, and a member of other various shapes may be used. Furthermore, the unit member 66 is not limited to a member including the hole portion 64, and a member without the hole portion 64, and the like may be used.

Furthermore, in the description made above, a case of forming the cavity 56 in the shaped object 52 in the three-dimensional object 50 has been mainly described. However, considering from the standpoint of reducing the material necessary for shaping and reducing the cost, and the like, consideration is also made to form the cavity 56 in the support portion 54, and the cavity is not limited to being formed in the shaped object 52.

FIG. 7(*c*) is a view showing a configuration of a further variant of the three-dimensional object 50, and shows one example of a configuration of the case when forming the cavity 56 in the support portion 54. In this case, the manufacturing apparatus 10 (see FIG. 1(*a*) and FIG. 1(*b*))

forms a plurality of support layers interiorly including the cavity in a layered manner by, for example, discharging the droplet of the support material from the support material head 304 (see FIG. 1(*a*) and FIG. 1(*b*)). In this case, other than using the support material in place of the cavity portion material, a cavity portion support layer forming step, a sandwiching member installing step, and a support layer-on-sandwiching member forming step are carried out same as or similar to the operations of the cavity portion material layer forming step, the sandwiching member installing step, and the material layer-on-sandwiching member forming step described using FIGS. 1(*a*) to 6(*c*)). In this case, the cavity portion support layer forming step is a step in which the manufacturing apparatus 10 discharges the droplet of the support material from the support material head 304 to form the cavity portion support layer, which is the support layer configuring the periphery of at least one part of the cavity 56. Furthermore, the sandwiching member installing step is a step in which the manufacturing apparatus 10 installs the lid member, arranged with at least one part sandwiched between the plurality of support layers, on the cavity portion support layer. Furthermore, the support material-on-sandwiching member forming step is a step in which the manufacturing apparatus 10 discharges the droplet of the support material on at least one part of the lid member 60 from the support material head 304 to form the support layer on the lid member 60.

According to such configuration, the support portion 54 interiorly including the cavity 56 can be appropriately formed using the lid member 60. Thus, the usage amount of the support material can be reduced, and the cost required for the shaping can be appropriately suppressed. Furthermore, the support material can be more easily removed after the completion of the shaping by forming the cavity 56 in the support portion 54.

In a further variant of the three-dimensional object 50, for example, use of a configuration other than a simple lid-shaped member (lid member 60) for the sandwiching member, and the like are also considered. FIG. 7(*d*) is a view showing a configuration of a further variant of the three-dimensional object 50, and shows one example of a configuration of the case when installing a substrate 67 mounted with an electronic circuit as the sandwiching member to be sandwiched between the cavity portion material layers, and the like. The substrate 67 is a circuit substrate mounted with a circuit component 68. Furthermore, the substrate 67 is one example of an electronic circuit substrate having at least a wiring pattern. Use of a circuit component such as a resistor, a capacitor, a semiconductor, an Integrated Circuit (IC), a Large Scale Integration (LSI), and a Central Processing Unit (CPU), an input/output component such as a Light Emitting Diode (LED), a speaker, a microphone, and a motor, a sensor such as an optical sensor, and a thermistor, a power supply component such as a battery and a solar battery is considered for the circuit component 68. The present embodiment is not limited thereto, and other circuit components, and the like may be used. According to such configuration, for example, the shaped object 52 can be provided with various types of electronic functions such as a function enabling input/output of light, sound, voice, vibration, and the like.

When using such substrate 67 for the sandwiching member, the substrate 67 is preferably installed so that one part of the circuit component 68 does not project out beyond the upper surface of the substrate 67 in the sandwiching member installing step. According to such configuration, for example, the circuit component 68 can be appropriately prevented from inhibiting the operation of forming the cavity portion material layer after the sandwiching member installing step.

In the manufacturing method of the three-dimensional object 50 and the manufacturing apparatus according to the embodiment described above, a case of installing the lid member 60 on the shaping surface of the three-dimensional object 50 being shaped and shaping the three-dimensional object 50 interiorly including the cavity has been described, but the method for reducing the cavity portion material used for the shaping of the three-dimensional object 50 and reducing the weight of the three-dimensional object 50 is not limited thereto. For example, instead of installing the lid member 60 on the upper surface of the cavity 56 of the three-dimensional object 50, a solid body 32 having a specific weight different from the cavity portion material may be disposed in the cavity 56.

A three-dimensional object shaping method according to a variant will be described below.

Figure 8A:
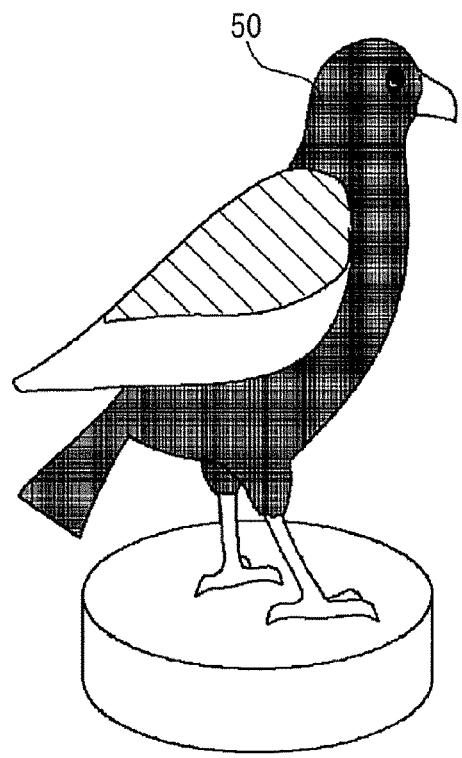
FIG. 8(a) and FIG. 8(b) are views describing one example of the three-dimensional object shaped by a three-dimensional object shaping method according to another embodiment.
Figure 8B:
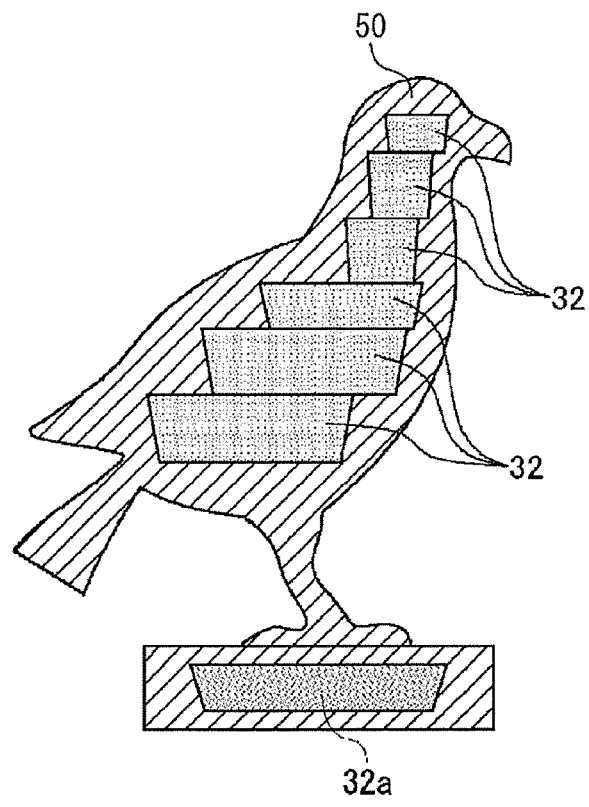

FIG. 8(*a*) is a view showing one example of the three-dimensional object 50 shaped by a three-dimensional object shaping method of the present embodiment, and FIG. 8(*b*) is a cross-sectional view of the three-dimensional object shown in FIG. 8(*a*). The three-dimensional object 50 shown in FIG. 8(*a*) is a bird standing on a pedestal, and the legs of the bird are thin. Thus, if the weight of the bird is heavy, the leg portion may break.

The bird serving as one example of the three-dimensional object 50 shaped by the three-dimensional object shaping method of the present embodiment has the solid body 32 therein, as shown in FIG. 8(*b*). The solid body 32 has a lighter specific weight than a curable resin, thus realizing lighter weight of the bird, which is the three-dimensional object 50. For example, with respect to the specific weight of the curable resin of about 1, the solid body 32 has an interior weight of about $\frac{1}{10}$ when a polyethylene foam having a specific weight of about 0.1 is used.

Although the solid body 32*a* is also in the pedestal, this solid body 32*a* has a greater specific weight than the curable resin. Thus, the center of gravity of the three-dimensional object can be lowered, and the three-dimensional object can be stably arranged. A block made of stainless steel having a specific weight of about 7.8, for example, is used for the solid body 32*a*, so that the solid body 32*a* does not rust, which is suitable.

Figure 9:
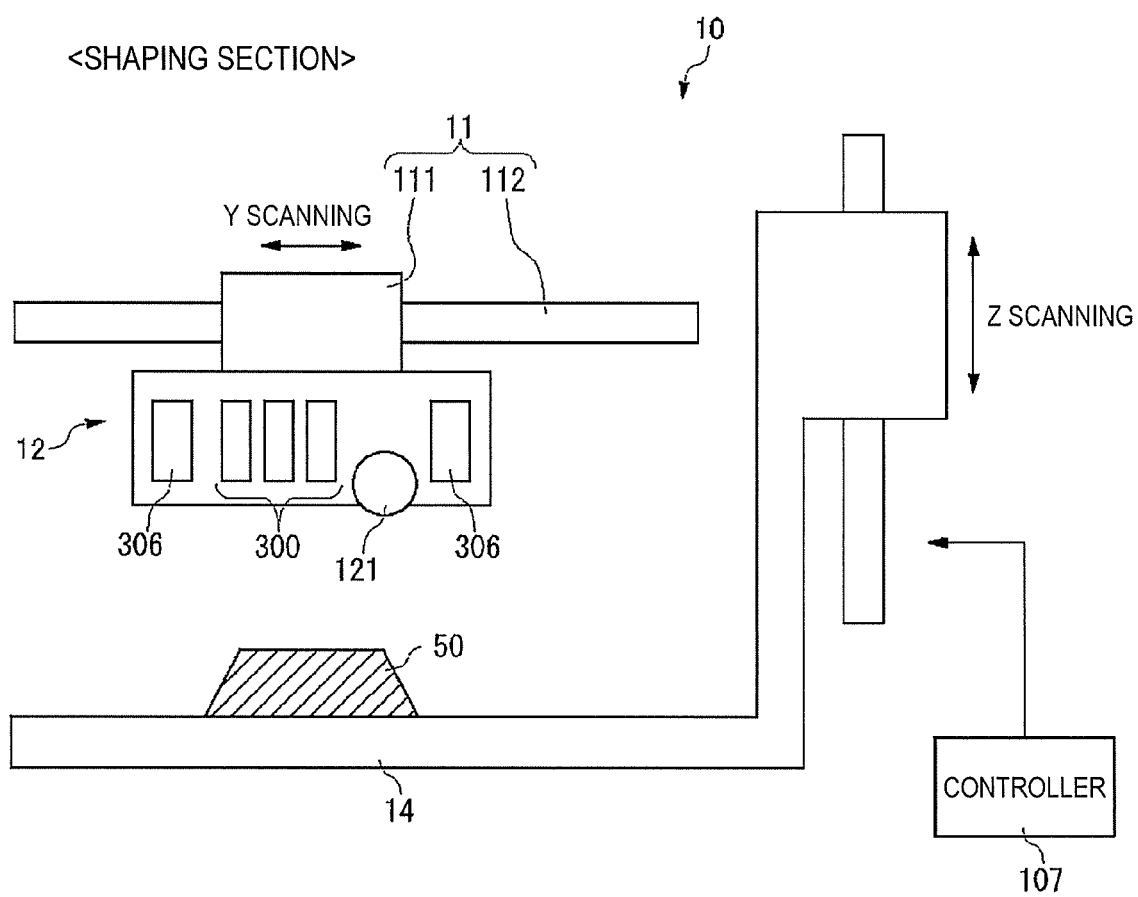
FIG. 9 is a view showing a configuration of a manufacturing apparatus according to another embodiment.

FIG. 9 is a view showing a configuration of the manufacturing apparatus 10 (shaping section) according to the variant. The shaping section in the manufacturing apparatus 10 is an inkjet type 3D printer that cures the ultraviolet curable resin injected from the inkjet head with the ultraviolet light to layer the ultraviolet curable resin. The manufacturing apparatus 10 includes the head portion 12, the main scanning driver 11, the shaping table 14, and the controller 107. The head portion 12 is a portion that discharges droplet (ink droplet) to become the material of the three-dimensional object 50. The manufacturing apparatus 10 is not limited to that using the ultraviolet curable resin, and may adopt a method of layering a thermoplastic curable resin injected at a high temperature state from the inkjet head and cured by being cooled to normal temperature.

The head portion 12 includes an ink head 300 (e.g., cavity portion material head 302, support material head 304) that discharges colored or colorless ink, which are cavity portion materials, and ink containing the support material, an ultraviolet light source 306 that cures the discharged ink, and the flattening roller 121 that flattens the layered surface of the curable resin formed during the shaping of the three-dimensional object 50. Although three ink heads 300 are shown here, the number of ink heads 300 may be set to an appropriate number according to the number of types of ink to use.

The head portion 12, for example, discharges the ink droplet and the like of the curable resin, which is cured by irradiation of the ultraviolet light, and cures the ink droplet to form each layer configuring the three-dimensional object 50. Specifically, the head portion 12, for example, discharges the ink droplet in response to an instruction of the controller 107 to repeatedly carry out a layer forming operation of forming a layer of curable resin and a curing operation of curing the layer of curable resin formed in the layer forming operation over plural times. The head portion 12 thereby forms a plurality of layers of cured curable resin in an overlapping manner.

The main scanning driver 11 is a driver that causes the head portion 12 to carry out the main scanning operation. The main scanning operation is, for example, an operation of discharging the ink droplet while moving in the main scanning direction (Y direction in the figure) set in advance.

The main scanning driver 11 includes a carriage 111 and a guide rail 112. The carriage 111 is a holding portion that holds the head portion 12 so as to face the shaping table 14. That is, the carriage 111 holds the head portion 12 so that the discharging direction of the ink droplet is a direction toward the shaping table 14. Furthermore, at the time of the main scanning operation, the carriage 111 is moved along the guide rail 112 while holding the head portion 12. The guide rail 112 is a rail-like member for guiding the movement of the carriage 111, and moves the carriage 111 in response to an instruction of the controller 107 at the time of the main scanning operation.

The movement of the head portion 12 in the main scanning operation may be a relative movement with respect to the three-dimensional object 50. For example, the three-dimensional object 50 side may be moved by fixing the position of the head portion 12 and, for example, moving the shaping table 14.

The shaping table 14 is one example of a mounting table, and is provided to mount the three-dimensional object 50 being shaped. The shaping table 14 has a function of moving the upper surface in the up and down direction (Z direction in the figure), and moves the upper surface in accordance with the advancement of the shaping of the three-dimensional object 50 in response to an instruction of the controller 107. Furthermore, in the manufacturing apparatus 10, a distance (gap) between a surface to be shaped in the three-dimensional object 50 in the middle of being shaped and the head portion 12 is thereby appropriately adjusted. The surface to be shaped of the three-dimensional object 50 is, for example, a surface on which the next layer is to be formed by the head portion 12. The scanning in the Z direction of moving the shaping table 14 up and down with respect to the head portion 12 may be, for example, carried out by moving the head portion 12 side.

The controller 107 is, for example, a CPU of the manufacturing apparatus 10, and controls each portion of the manufacturing apparatus 10 based on shape information, color image information, and the like of the three-dimensional object 50 to be shaped to control the operation of shaping of the three-dimensional object 50.

Furthermore, other than the configuration illustrated in FIG. 9, the manufacturing apparatus 10 may also include, for example, various types of configurations necessary for shaping, coloring, and the like of the three-dimensional object 50. For example, the manufacturing apparatus 10 may further include a sub-scanning driver for causing the head portion 12 to carry out the sub-scanning operation, and the like. The sub-scanning operation is, for example, an operation of relatively moving the inkjet head in the head portion 12 in the sub-scanning direction orthogonal to the main scanning direction with respect to the three-dimensional object 50 being shaped. The sub-scanning driver causes the head portion 12 to carry out the sub-scanning operation, as needed, when, for example, shaping the three-dimensional object 50 whose length in the sub-scanning direction is longer than a shaping width of the inkjet head in the head portion 12. The sub-scanning driver may be, for example, a driver for moving the guide rail along with the carriage holding the head portion 12.

Next, a three-dimensional object shaping method for shaping the three-dimensional object using the manufacturing apparatus 10 shown in FIG. 9 will be described. FIGS. 10(*a*) to 10(*d*) are views showing manufacturing processes of the three-dimensional object by the three-dimensional object shaping method of the present embodiment. For the sake of convenience of explanation, the three-dimensional object manufactured through the manufacturing processes shown in FIGS. 10(*a*) to 10(*d*) is different from the bird shown in FIG. 8(*a*).

The manufacturing apparatus 10 layers the resin based on the three-dimensional shape information, and layers the support portion 54 and the three-dimensional object 50 on the shaping table 14. When the three-dimensional object 50 becomes larger toward the upper side, the curable resin cannot be layered, so called "overhang" occurs since a surface to newly layer on an existing layering surface is larger. The support portion 54 is a layered structural object (support layer) for supporting the three-dimensional object 50 by surrounding the outer periphery of the three-dimensional object 50 being shaped, whereby the curable resin can be layered on the overhanging portion. The support portion 54 is, for example, dissolved and removed with water after the completion of the shaping of the three-dimensional object 50.

In the present embodiment, the three-dimensional shape information is information including a space in the interior of the three-dimensional object. As shown in FIG. 10(*a*), the shape of the exterior of the three-dimensional object is formed, and the cavity 56 is formed in the interior. This corresponds to a "first process". The cavity 56 has a shape whose diameter becomes greater toward the upper side. The data of the cavity 56 may be created at the same time when designing the three-dimensional shape with the Computer Aided Design (CAD), and the like, or may be created when adjusting the orientation, size, disposition, and the like at the time of shaping before the shaping. In the case of the shaping data created with a three-dimensional scanner, the latter procedure is adopted.

After the shape of FIG. 10(*a*) is created, the layering is once stopped, and the solid body 32 is fitted into the cavity 56, as shown in FIG. 10(*b*). In the present embodiment, a foamable resin is used for the solid body 32. A material that does not cause chemical reaction even if brought into contact with the shaping material such as polyethylene, polypropylene, and polyethylene terephthalate is used for the resin raw material. With the foamable resin, the shaping material may enter a hole portion of a bubble if the bubble is large and the thickness of the layering may not be maintained, and thus the foamable resin of "single bubble" in which the individual air bubble is independent is preferred. The solid body 32 is not limited to the foamable resin, and merely needs to be a material that does not react with the curable resin, and for example, sponge, wood, cork, rubber, and the like can be used. The solid body 32 preferably has a smaller specific weight than the curable resin.

The shape of the solid body 32 is preferably a shape that can be fitted into the cavity 56. The solid body may have a trapezoidal cross-section such as the solid body 32 shown in FIG. 10(b) or a rectangular cross-section slightly wider than the cavity 56 to be fitted by the softness of the raw material. If the fitting is poor and a gap forms between the cavity 56 and the solid body 32, the curable resin to be layered may flow into the gap thus becoming a cause of shaping failure.

Figure 10A:
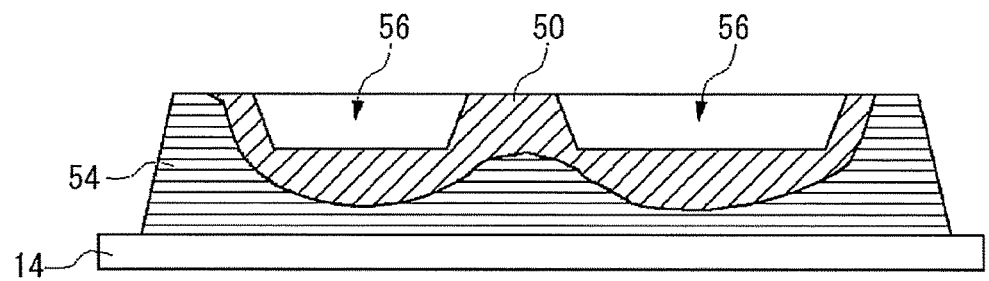
FIG. 10(a) to FIG. 10(d) are views showing manufacturing processes of the three-dimensional object by the three-dimensional object manufacturing method according to another embodiment.
Figure 10B:
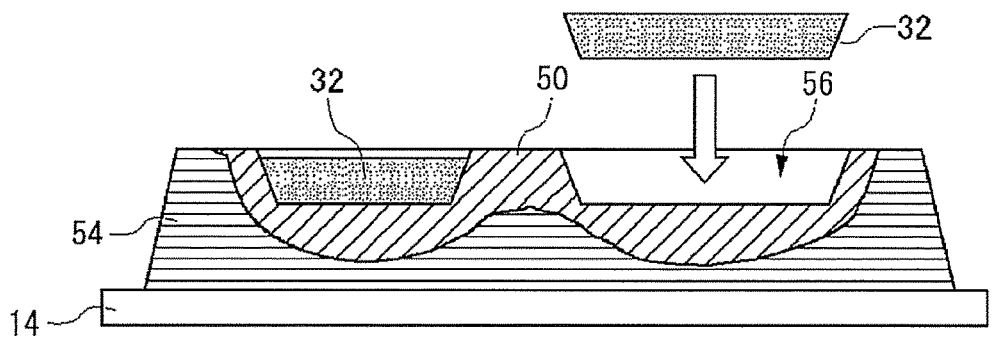
Figure 10C:
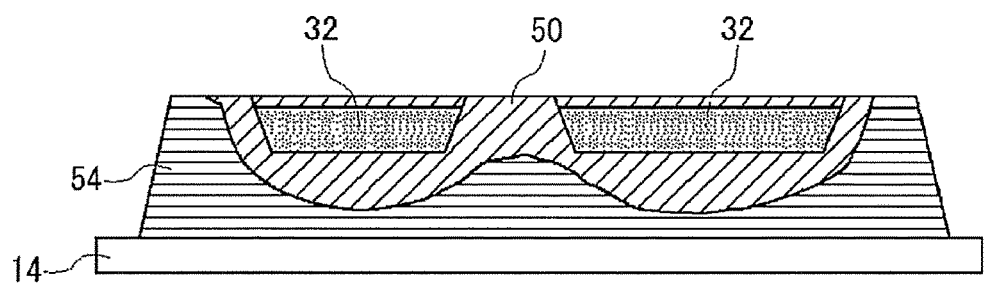

The operation of fitting the solid body 32 into the cavity 56 is manually carried out by a user. After the solid body 32 is fitted into the cavity 56, the layering by the manufacturing apparatus 10 is resumed, and the curable resin is layered on the solid body 32, as shown in FIG. 10(c). This corresponds to a "second process".

Figure 11A:
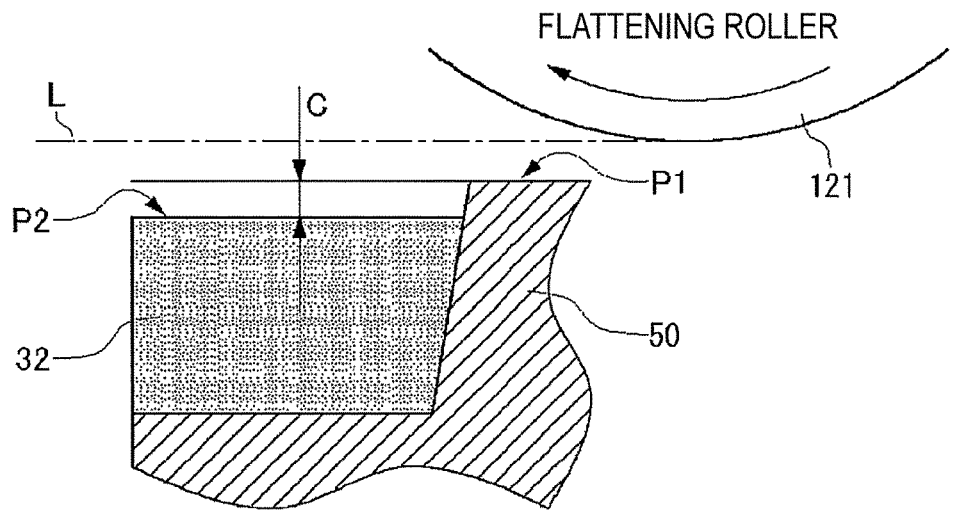
FIG. 11(a) to FIG. 11(c) are views showing a relationship of a cavity and a solid body.

The relationship of the depth of the cavity 56 and the height of the solid body 32 will now be described. FIG. 11(a) is a view showing a state in which the solid body 32 is fitted into the cavity 56 (see FIG. 10(b)). As shown in FIG. 11(a), the height of the solid body 32 is low with respect to the depth of the cavity 56, and a clearance C of about 200 μm is formed between an upper surface P1 of the layer defining the cavity 56 and an upper surface P2 of the solid body 32. 200 μm is one example, and the size of the clearance C can be appropriately designed.

When layering the curable resin on the surface P1, which is the surface to be shaped, and the upper surface P2 of the solid body 32, a process of discharging the curable resin onto the surface to be shaped, flattening the resin to become flat with the flattening roller 121 and thereafter curing the resin with the ultraviolet light is carried out. In FIG. 11(a), a chain dashed line L indicates a path of the lower end of the flattening roller 121. In the present embodiment, the solid body 32 is lower than the surface P1 by the amount of clearance C, so that an event in which the flattening roller 121 collides with the solid body 32 can be prevented beforehand.

Figure 11B:
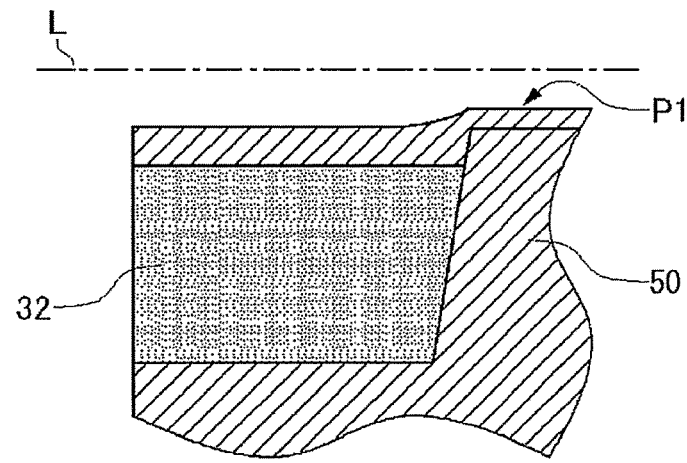
Figure 11C:
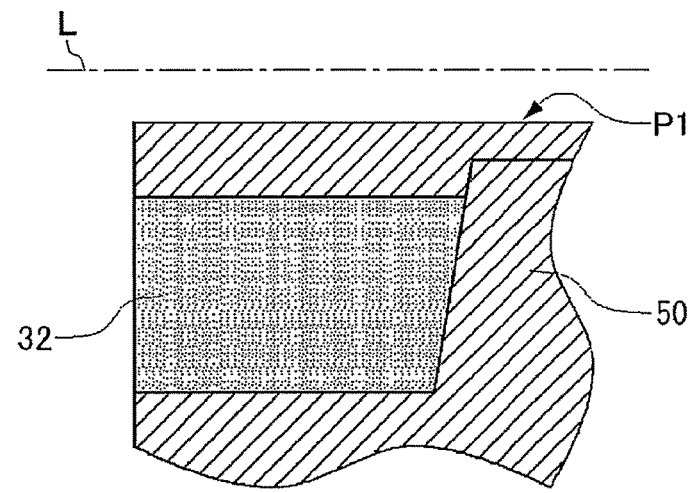

In the present embodiment, after fitting the solid body 32 into the cavity 56, the curable resin for forming the three-dimensional object 50 is discharged onto the entire upper surface of the solid body 32. In this case, the curable resin is discharged such that the amount of curable resin is slightly more (e.g., 20% more) than the necessary amount for forming one layer. The curable resin discharged with slightly more amount is flattened with the flattening roller 121, so that a step difference between a location where the solid body 32 was arranged and other locations gradually becomes smaller, as shown in FIG. 11(b), and after layering about 20 layers, the surface to be shaped P1 becomes a plane, as shown in FIG. 11(c). Thus, when fitting the solid body 32 the next time, the relevant solid body can be appropriately fitted.

Figure 10D:
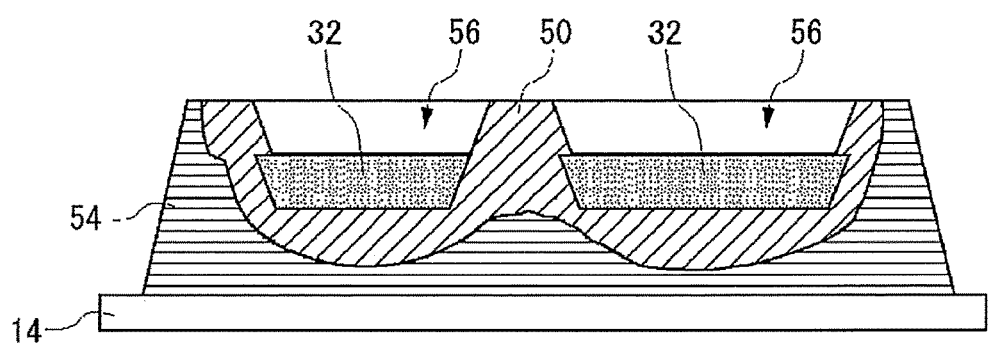

The description will now be made returning back to FIGS. 10(a) to 10(d). The layering is continuously carried out according to the three-dimensional shape information by the manufacturing apparatus 10 even after the state of FIG. 10(c), and the shape of the exterior of the three-dimensional object 50 is formed and the cavity 56 is formed in the interior, as shown in FIG. 10(d). The manufacturing apparatus 10 then once stops the layering to fit the solid body 32. Thus, the three-dimensional object 50 interiorly including the solid body 32 can be shaped by repeatedly carrying out the operations of forming the cavity 56, fitting the solid body 32, and then layering.

In the description made above, an example of further forming the cavity 56 on the cavity 56 to which the solid body 32 has been fitted (see FIG. 10(d)) has been shown, but a new cavity 56 does not necessarily need to be formed, and the curable resin may be layered without forming an empty space from the state shown in FIG. 10(c) to shape the three-dimensional object. The number of empty spaces and the size thereof to be formed inside the three-dimensional object can be appropriately designed according to the shape of the three-dimensional object, the extent of reducing the consumption of the shaping material, the extent of reducing the weight, and the like.

The three-dimensional object shaping method of the present embodiment has been described above. The three-dimensional object shaping method of the present embodiment can reduce the weight of the three-dimensional object 50 as the three-dimensional object 50 interiorly including the solid body 32 having a smaller specific weight than the curable resin is produced. Thus, even if the three-dimensional object 50 has a thin portion, the risk of breaking of such portion can be reduced.

The three-dimensional object shaping method of the present embodiment can maintain the strength of the three-dimensional object 50 even for the portion of the cavity 56 since the solid body 32 is inserted inside, thus allowing the layering of the upper surface of the solid body 32. Furthermore, the three-dimensional object 50 can be inexpensively formed by selecting an inexpensive material for the solid body 32. Moreover, the strength with respect to the force in the up and down direction can be ensured by forming a column structure of the three-dimensional object 50 between the plurality of solid bodies 32 as in FIGS. 10(a) to 10(d).

Figure 12:
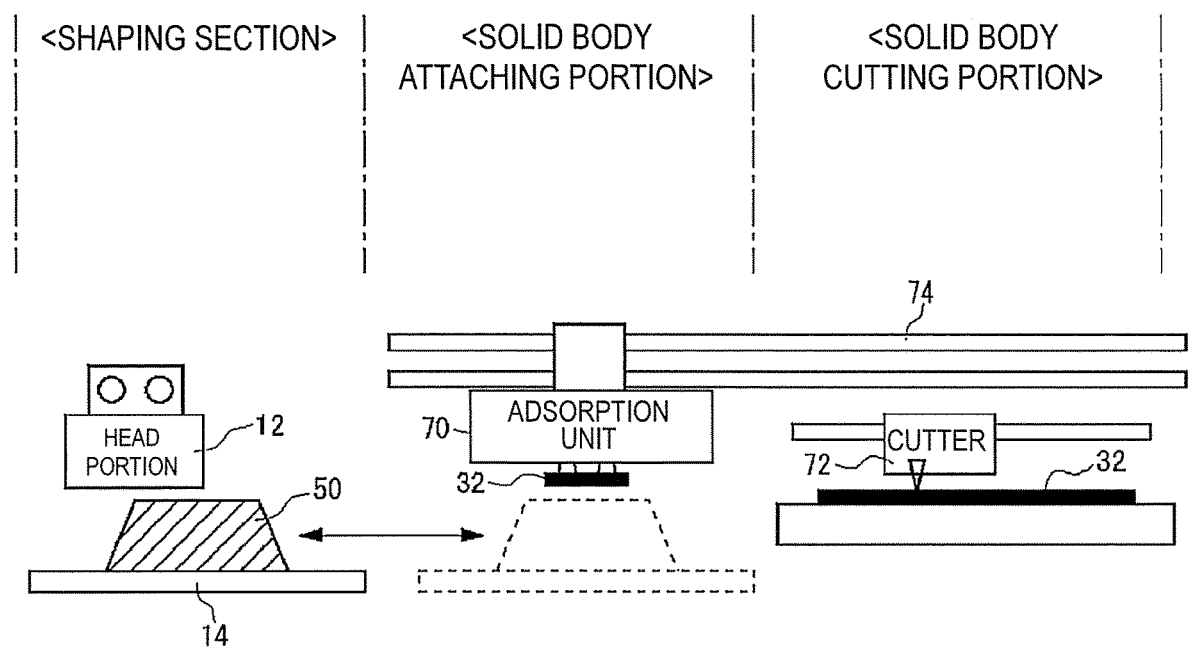
FIG. 12 is a view showing a configuration of a manufacturing apparatus that carries out the fitting of the solid body to the cavity.

The three-dimensional object shaping method of the present invention has been described in detail above using the embodiment, but the present invention is not limited to such embodiment. In the embodiment described above, an example in which the user manually carries out the operation of fitting the solid body 32 into the cavity 56 has been described, but the solid body 32 may be automatically fitted. FIG. 12 is a view showing a configuration of the manufacturing apparatus 10 capable also carrying out the fitting of the solid body 32 into the cavity 56. In the manufacturing apparatus 10 shown in FIG. 12, the shaping section has a configuration same as the device shown in FIG. 9. The device shown in FIG. 12 has, in addition to such configuration, a solid body cutting portion and a solid body attaching portion.

The solid body cutting portion includes a cutter 72, and for example, has a function of cutting the solid body 32 according to the shape of the cavity 56. A rail 74 is placed between the solid body cutting portion and the solid body attaching portion, and the adsorption unit 70 reciprocately moves on the rail 74. The adsorption unit 70 adsorbs the solid body 32 cut with the solid body cutting portion, and conveys the same to the solid body attaching portion. In the shaping section, the shaping table 14 mounted with the three-dimensional object 50 interiorly formed with the cavity 56 is sled to the solid body attaching portion. Then, in the solid body attaching portion, the adsorption unit 70 fits the solid body 32 into the cavity 56 formed in the three-dimensional object 50. After fitting the solid body 32 into the cavity 56, the shaping table 14 mounted with the three-dimensional object 50 is returned to the shaping section, and the layering of the three-dimensional object 50 is resumed. The solid body 32 can be automatically fitted by using such manufacturing apparatus 10.

Figure 13A:
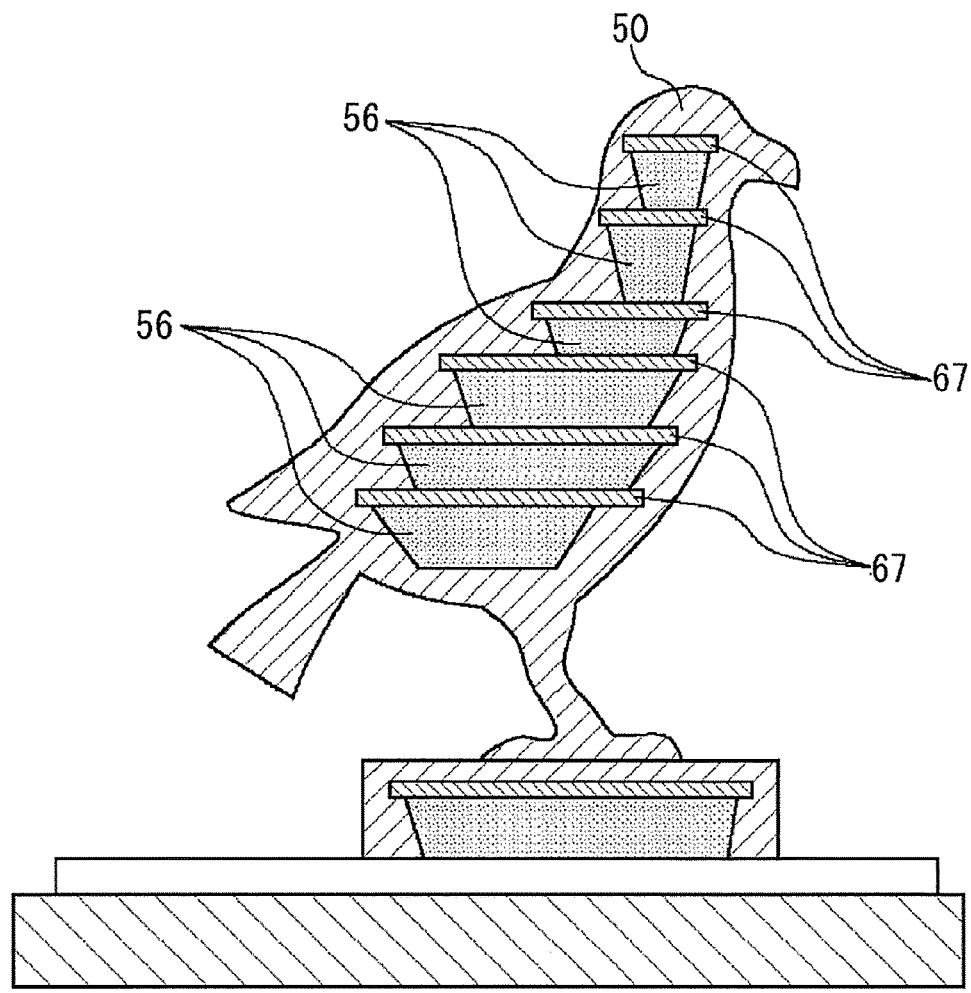
FIG. 13(a) and FIG. 13(b) are views describing one example of a three-dimensional object shaped by the three-dimensional shaping method according to another embodiment.
Figure 13B:
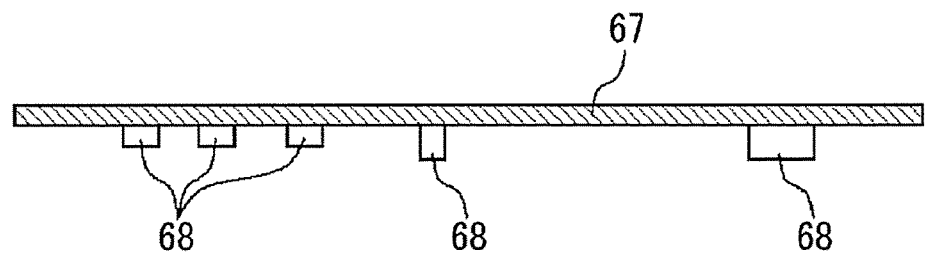

Furthermore, the substrate 67 including the circuit component 68 similar to above may be inserted as the solid body 32. FIG. 13(*a*) is a cross-sectional view of the three-dimensional object inserted with the substrate 67 including the circuit component 68, and FIG. 13(*b*) is a view showing a configuration of the substrate 67 including the circuit component 68. A one-side mounting substrate is used for the substrate 67 as the upper surface side becomes the layering surface. A general electronic component such as a microprocessor, a microphone, a speaker, a Light Emitting Diode (LED), various types of sensors, a motor, and a battery is mounted for the circuit component 68.

The substrate 67 is inserted into the cavity 56 with the surface including the circuit component 68 facing the cavity 56, that is, the surface including the circuit component 68 facing downward. By inserting the substrate 67 including the circuit component 68 into the solid body 32, controls such as causing the three-dimensional object 50 to emit light, to move, or to output sound can be carried out. When the one-side mounting substrate 67 is provided, the solid body 32 that easily deforms according to the irregularities of the circuit component 68 is used, but the solid body 32 does not necessarily need to be fitted into the cavity 56. Furthermore, when fitting a soft object like a sponge for the solid body 32, a sponge slightly larger than the cavity 56 can be used to eliminate the clearance of the inner wall of the cavity 56 and the sponge. In this case, the sponge may run out from the cavity 56, but this can be suppressed by using a metal plate such as a stainless steel, or a plastic plate such as an acrylic, and the like instead of the mounting substrate of the circuit component 68 for the substrate 67.

Figure 14A:
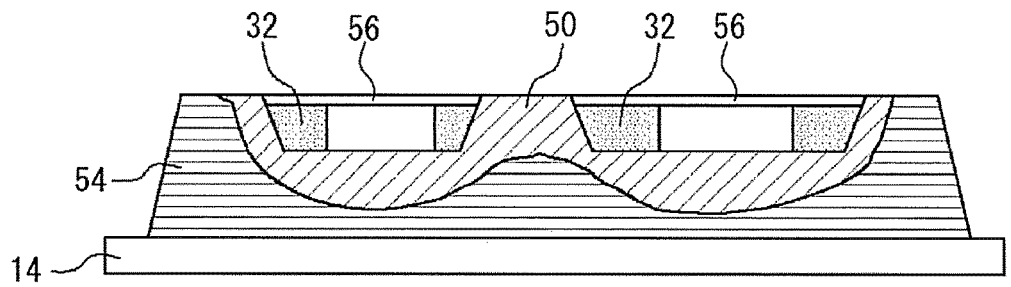
FIG. 14(a) to FIG. 14(c) are views describing one example of three-dimensional object shaped by the three-dimensional object shaping method according to another embodiment.
Figure 14B:
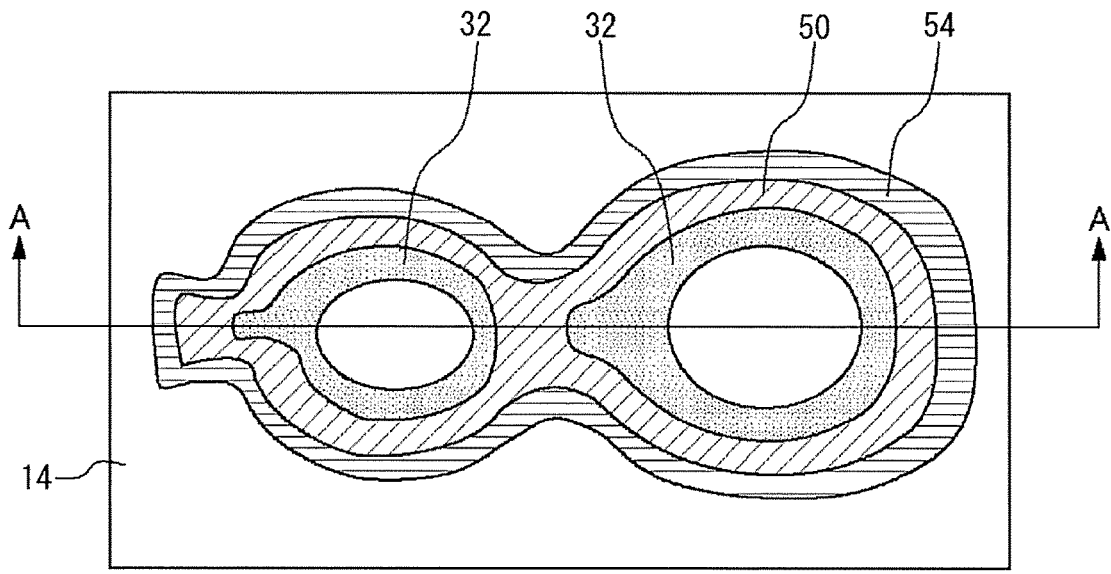
Figure 14C:
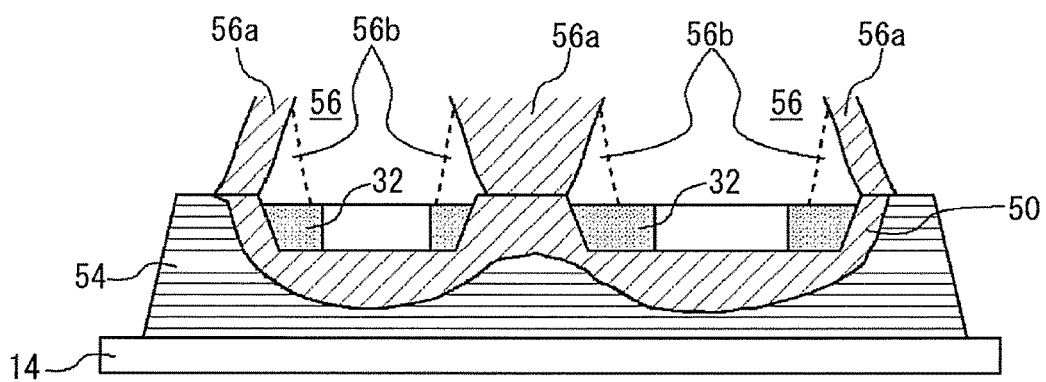

Furthermore, in the embodiment described above, an example of fitting the solid body 32 having substantially the same shape as the shape of the cavity 56 has been described, but the solid body 32 may not necessarily have the same shape as the cavity 56. FIG. 14(*a*) is a cross-sectional view showing an example in which an annular solid body 32 is fitted into the cavity 56, and FIG. 14(*b*) is a top view thereof. FIG. 14(*a*) is an A-A cross-section of FIG. 14(*b*).

As shown in FIG. 14(*a*) and FIG. 14(*b*), the curable resin can be layered on the solid body 32 by connecting the annular solid body 32 and the inner wall of the cavity 56. Thus, if the solid body 32 is not present, the overhanging shape may form when forming the inner wall 56*a* of the cavity 56, as shown with a solid line in FIG. 14(*c*), and the inner wall 56*a* of the cavity 56 may become difficult to form, but as a resin 56*b* can also be layered on the upper surface of the solid body 32 as shown with a dotted line by the annular solid body 32, the overhanging state can be avoided and the cavity 56 can be appropriately formed.

Furthermore, in the embodiment described above, an example of layering the curable resin over the entire solid body 32 to eliminate the step difference of the solid body 32 and the surface to be shaped and planarize the same, as shown in FIG. 10(*c*), after inserting the solid body 32 has been described, but the layering of forming the shape of the exterior while forming the cavity 56 shown in FIG. 10(*a*) may be carried out without carrying out such process.

Moreover, if the shapes of the plurality of cavities 56 are the same in the embodiment described above, the data generation of the arrangement of the cavity 56 is facilitated and automatic data generation is also facilitated. Furthermore, as the corresponding plurality of solid bodies 32 also become the same, production of the solid body 32 and the fitting work to the cavity 56 are also easily made efficient, standardized, and automated.

The effects of the three-dimensional object shaping method of the present embodiment will be described below.

(1) In the three-dimensional object shaping method of the present embodiment, the first process of layering a curable resin and shaping a shape of the exterior of the three-dimensional object 50 while forming the cavity 56 in the interior (see FIG. 10(*a*)), and the second process of fitting the solid body 32 into the cavity 56 (see FIG. 10(*b*)) and further layering the curable resin on the solid body 32 (see FIGS. 10(*c*) and 10(*d*)) are carried out once or over plural times. The consumption of the shaping material can be reduced by forming the cavity 56 inside the three-dimensional object 50 and fitting the solid body 32 in the cavity 56. Furthermore, since the cavity 56 formed in the interior of the three-dimensional object 50 needs to have the upper part closed with the curable resin, at least one part of the inner wall of the cavity 56 has an overhanging shape (e.g., 30*a* of FIG. 14(*c*)), but the overhanging can be avoided by layering the resin with the solid body 32 as a base.

(2) In the three-dimensional object shaping method of the present embodiment, the solid body 32 having a smaller specific weight than the curable resin is fitted. The weight of the three-dimensional object 50 can be reduced by fitting the solid body 32 having a smaller specific weight than the curable resin into the cavity 56 formed in the interior of the three-dimensional object 50.

(3) In the three-dimensional object shaping method of the present embodiment, the solid body 32 lower than the depth of the cavity 56 is fitted (see FIG. 11(*a*)). According to such configuration, the solid body 32 does not project out from the cavity 56, and collision with the flattening roller 121 for flattening the layering surface of the curable resin can be avoided.

(4) In the three-dimensional object shaping method of the present embodiment, a plurality of layers of curable resin are layered until the layering surface becomes flat on the upper surface of the layer to form the cavity 56 and the solid body 32 (see FIGS. 11(*a*) to 11(*c*)). According to such configuration, the step difference of the upper surface of the layer to form the cavity 56 and the solid body 32 can be eliminated.

(5) In the three-dimensional object shaping method of the present embodiment, the cavity 56 whose diameter becomes larger toward the upper side may be formed (see FIG. 10(*a*)). According to such configuration, the inner wall of the cavity 56 is easily formed and the solid body 32 is easily fitted into the cavity 56.

(6) In the three-dimensional object shaping method of the present embodiment, the foamable resin is used for the solid body 32. According to such configuration, the three-dimensional object 50 can be lightly and inexpensively shaped.

(7) In the three-dimensional object shaping method according to a variant of the present embodiment, the substrate 67 formed with the circuit component 68 is installed with the surface formed with the circuit component 68 facing the cavity 56, and the curable resin may be further layered on the substrate 67 (see FIG. 13(*a*) and FIG. 13(*b*)). According to such configuration, the controls such as causing the three-dimensional object 50 to emit light, to move, or to output sound from the three-dimensional object 50 can be carried out.

(8) In the three-dimensional object shaping method of the present embodiment, the solid body 32*a* having a greater specific weight than the curable resin is fitted into the pedestal on the lower side of the three-dimensional object 50 (see FIG. 8(*a*) and FIG. 8(*b*)). According to such configuration, the center of gravity of the three-dimensional object 50 is lowered so that the three-dimensional object 50 can be stably mounted.

(9) Furthermore, in the three-dimensional object shaping method of the present embodiment, the first process of layering the curable resin and shaping the shape of the exterior of the three-dimensional object 50 while forming the cavity 56 in the interior (see FIG. 10(*a*)), and the second process of fitting the solid body 32 into the cavity 56 (see FIG. 10(*b*)) and further layering the curable resin on the solid body 32 (see FIGS. 10(*c*) and 10(*d*)) are carried out once or over plural times. The consumption of the shaping material can be reduced by forming the cavity 56 in the interior of the three-dimensional object 50 and fitting the solid body 32 in the cavity 56. Furthermore, since the cavity 56 formed in the interior of the three-dimensional object 50 needs to have the upper part closed with the curable resin, at least one part of the inner wall of the cavity 56 has an overhanging shape (e.g., 56*a* of FIG. 14(*c*)), but the overhanging can be avoided by layering the resin with the solid body 32 as a base.

(10) In the three-dimensional object shaping method of the present embodiment, the solid body 32 having a smaller specific weight than the curable resin is fitted. The weight of the three-dimensional object 50 can be reduced by fitting the solid body 32 having a smaller specific weight than the curable resin into the cavity 56 formed in the interior of the three-dimensional object 50.

(11) In the three-dimensional object shaping method of the present embodiment, the solid body 32 lower than the depth of the cavity 56 is fitted (see FIG. 11(*a*)). According to such configuration, the solid body 32 does not project out from the cavity 56, and collision with the flattening roller 121 for flattening the layering surface of the curable resin can be avoided.

(12) The three-dimensional object shaping method of the present embodiment layers a plurality of layers of curable resin until the layering surface becomes flat on the upper surface of the layer to form the cavity 56 and the solid body 32 (see FIGS. 11(*a*) to 11(*c*)). According to such configuration, the step difference of the upper surface of the layer to form the cavity 56 and the solid body 32 can be eliminated.

(13) In the three-dimensional object shaping method of the present embodiment, the cavity 56 whose diameter becomes larger toward the upper side may be formed (see FIG. 10(*a*)). According to such configuration, the inner wall of the cavity 56 is easily formed and the solid body 32 is easily fitted into the cavity 56.

(14) In the three-dimensional object shaping method of the present embodiment, the foamable resin is used for the solid body 32. According to such configuration, the three-dimensional object 50 can be lightly and inexpensively shaped.

(15) In the three-dimensional object shaping method according to a variant of the present embodiment, the substrate 67 formed with the circuit component 68 is installed with the surface formed with the circuit component 68 facing the cavity 56, and the curable resin may be further layered on the substrate 67 (see FIG. 13(*a*) and FIG. 13(*b*)). According to such configuration, the controls such as causing the three-dimensional object 50 to emit light, to move, or to output sound from the three-dimensional object 50 can be carried out.

(16) In the three-dimensional object shaping method of the present embodiment, the solid body 32*a* having a greater specific weight than the curable resin is fitted into the pedestal on the lower side of the three-dimensional object 50 (see FIG. 8(*a*) and FIG. 8(*b*)). According to such configuration, the center of gravity of the three-dimensional object 50 is lowered so that the three-dimensional object 50 can be stably mounted.

INDUSTRIAL APPLICABILITY

The present invention can be suitably used, for example, for the shaping method of the three-dimensional object.

The present invention relates to a three-dimensional object shaping method for shaping a three-dimensional object through a layering and shaping method.

The invention claimed is:

1. A three-dimensional object manufacturing method for shaping a three-dimensional object interiorly including at least a first cavity and a second cavity by layering a plurality of material layers, which are layers formed with a material used for shaping of the three-dimensional object, the three-dimensional object manufacturing method comprising:
    a first cavity portion material layer forming step of discharging a droplet of a cavity portion material, which is the material configuring at least one part of a periphery of the first cavity, from a discharging head through an inkjet method to form a first cavity portion material layer, which is the material layer configuring the periphery of at least one part of the first cavity;
    a first sandwiching member installing step of installing a first sandwiching member, which is a member arranged with at least one part sandwiched between the plurality of material layers, on the first cavity portion material layer; and
    a second cavity portion material layer forming step of discharging a droplet of the cavity portion material, which is the material configuring at least one part of a periphery of the second cavity, from the discharging head through the inkjet method to form a second cavity portion material layer, which is the material layer configuring the periphery of at least one part of the second cavity;
    a second sandwiching member installing step of installing a second sandwiching member, which is a member arranged with at least one part sandwiched between the plurality of material layers, on the second cavity portion material layer; and
    a material layer-on-sandwiching member forming step of discharging the droplet of the cavity portion material from the discharging head through the inkjet method on at least one part of the second sandwiching member to further faun the material layer on the second sandwiching member;
    wherein the first and second cavities are empty spaces respectively in which the material is not provided;
    wherein the first cavity that remains as the empty space inside the three-dimensional object is enclosed by the first cavity portion material layer and the first sandwiching member, and the second cavity that remains as the empty space inside the three-dimensional object is enclosed by the second cavity portion material layer, the first sandwiching member and the second sandwiching member,
    wherein the first sandwiching member is installed between the first cavity and the second cavity.

2. The three-dimensional object manufacturing method according to claim 1, wherein the sandwiching member installing step includes:
    installing the sandwiching member on the cavity portion material layer so that the sandwiching member is hidden in an interior of the three-dimensional object after completion of shaping.

3. The three-dimensional object manufacturing method according to claim 1, the sandwiching member installing step includes:
  installing the sandwiching member such that a shape of an outer periphery of the sandwiching member becomes greater than an opening of the cavity at a position for installing the sandwiching member.

4. The three-dimensional object manufacturing method according to claim 1, wherein
  in the three-dimensional object obtained after completion of shaping, at least one part of an inner wall of the three-dimensional object surrounding the cavity has an overhanging shape in which a portion on an upper side projects out toward an inner side of the cavity than a lower side in the cavity; and
  the sandwiching member installing step includes: installing the sandwiching member at a position to form the inner wall to an overhanging shape.

5. The three-dimensional object manufacturing method according to claim 1, wherein
  the sandwiching member is a sheet-like member.

6. The three-dimensional object manufacturing method according to claim 1, wherein
  the sandwiching member is a plate-like member.

7. The three-dimensional object manufacturing method according to claim 1, wherein
  the sandwiching member is a member formed with a material having adhesiveness with respect to the cavity portion material.

8. The three-dimensional object manufacturing method according to claim 1, wherein
  the cavity portion material is an ultraviolet curable ink; and
  the sandwiching member is a member formed with a material on which an ultraviolet curable ink fixes when irradiated with an ultraviolet light.

9. The three-dimensional object manufacturing method according to claim 1, wherein
  the sandwiching member is an electronic circuit substrate having at least a wiring pattern.

10. A manufacturing apparatus that shapes a three-dimensional object while forming a support layer for supporting a periphery of the three-dimensional object being shaped, and the manufacturing apparatus comprising:
  a discharging head that discharges a droplet of a support material, which becomes a material of the support layer, through an inkjet method to form a plurality of support layers interiorly including a first cavity and a second cavity in a layered manner;
  a sandwiching member installer that installs a first sandwiching member and a second sandwiching member, which are members arranged with at least one part sandwiched between the plurality of support layers, on the support layer; and
  a controller,
  wherein the discharging head discharges the droplet of the support material to form a first cavity portion support layer, which is the support layer configuring a periphery of at least one part of the first cavity,
  the sandwiching member installer installs the first sandwiching member on the first cavity portion support layer, and
  wherein the discharging head discharges the droplet of the support material to form a second cavity portion support layer, which is the support layer configuring a periphery of at least one part of the second cavity,
  the sandwiching member installer installs the second sandwiching member on the second cavity portion support layer, and
  the discharging head further discharges the droplet of the support material on at least one part of the second sandwiching member to form the support layer on the second sandwiching member;
  wherein the controller is configured to control the discharging head and the sandwiching member installer, so that:
    the first and second cavities are provided as empty spaces respectively in which the material is not provided; and
  the first cavity that remains as the empty space inside the three-dimensional object is enclosed by the first cavity portion support layer and the first sandwiching member, and the second cavity that remains as the empty space inside the three-dimensional object is enclosed by the second cavity portion support layer, the first sandwiching member and the second sandwiching member,
  wherein the first sandwiching member is installed between the first cavity and the second cavity.

* * * * *